(12) United States Patent
Gao et al.

(10) Patent No.: US 12,404,292 B2
(45) Date of Patent: Sep. 2, 2025

(54) AMINO-IMINE METAL COMPLEX AND PREPARATION METHOD THEREFOR AND APPLICATION THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Rong Gao, Beijing (CN); Jingjing Lai, Beijing (CN); Zifang Guo, Beijing (CN); Qingqiang Gou, Beijing (CN); Junling Zhou, Beijing (CN); Xiaofan Zhang, Beijing (CN); Dongbing Liu, Beijing (CN); Jie Lin, Beijing (CN); Xinyang Li, Beijing (CN); Junhui Zhang, Beijing (CN); Yuanning Gu, Beijing (CN); Yan Li, Beijing (CN); Jingyan An, Beijing (CN); Hui Zhao, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(*) Notice: Subject to any disclaimer, the term of this patent is extended or adjusted under 35 U.S.C. 154(b) by 715 days.

(21) Appl. No.: 17/755,484

(22) PCT Filed: Oct. 30, 2020

(86) PCT No.: PCT/CN2020/125279
§ 371 (c)(1),
(2) Date: Apr. 29, 2022

(87) PCT Pub. No.: WO2021/083330
PCT Pub. Date: May 6, 2021

(65) Prior Publication Data
US 2023/0002432 A1  Jan. 5, 2023

(30) Foreign Application Priority Data

Oct. 31, 2019 (CN) .......................... 201911049822.8
Oct. 31, 2019 (CN) .......................... 201911049911.2

(51) Int. Cl.
*C07F 15/04* (2006.01)
*C08F 4/70* (2006.01)
*C08F 10/02* (2006.01)

(52) U.S. Cl.
CPC ............. *C07F 15/04* (2013.01); *C08F 4/70* (2013.01); *C08F 10/02* (2013.01)

(58) Field of Classification Search
CPC .......... C07F 15/04; C07F 15/045; C08F 4/70; C08F 10/02; C08F 210/16; C08F 2410/03; Y02P 20/52
See application file for complete search history.

(56) References Cited

U.S. PATENT DOCUMENTS 2,825,721 A    3/1958   Paul et al.
6,103,658 A    8/2000   Mackenzie et al.
6,660,677 B1   12/2003  Mackenzie et al.

FOREIGN PATENT DOCUMENTS

| CN | 102250152 A | 11/2011 |
| CN | 105482000 A | 4/2016 |
| CN | 106397260 A | 2/2017 |
| CN | 106397264 A | 2/2017 |
| EP | 4053174 A1  | 9/2022 |
| RU | 2681535 C1  | 3/2019 |
| WO | 9623010 A3  | 12/1996 |
| WO | 9803521 A1  | 1/1998 |
| WO | 9840374 A3  | 12/1998 |
| WO | 9905189 A1  | 2/1999 |

(Continued)

OTHER PUBLICATIONS

Rong Gao, Zifang Guo, Junling Zhou, Yan Li, Dongbing Liu, Xiaofan Zhang, One-step synthesis of hollow spherical polyethylene by dispersion polymerization, Mar. 31, 2020 (Year: 2020).*

(Continued)

*Primary Examiner* — Daniel C. McCracken
*Assistant Examiner* — Joshua Maxwell Speer
(74) *Attorney, Agent, or Firm* — NKL Law; Allen Xue

(57) ABSTRACT

An amino-imine metal complex represented by Formula I, its preparation method and an application thereof are provided. The complex is used as a main catalyst in catalysts for olefin polymerization, and can catalyze the polymerization of ethylene at a relatively high temperature to prepare branched polyethylene having high molecular weight.

Formula I

22 Claims, No Drawings

(56) References Cited

FOREIGN PATENT DOCUMENTS

| WO | 9962968 | A1 | 12/1999 |
|---|---|---|---|
| WO | 0006620 | A2 | 2/2000 |

OTHER PUBLICATIONS

Huo, Ping et al.; "Nickel(II) Complexes with Three-Dimensional Geometry α-Diimine Ligands: Synthesis and Catalytic Activity toward Copolymerization of Norbornene"; Organometallics; vol. 32; Apr. 4, 2013; pp. 2291-2299.

Gao, Rong et al., "One-step synthesis of hollow spherical polyethylene by dispersion polymerization"; Journal of Catalysis, vol. 385, Mar. 31, 2020; pp. 103-106.

He Xiaohui et al.; "Highly Symmetric Single Nickel Catalysts Bearing Bulky Bis(a-Diimine) Ligand: Synthesis, Characterization, and Electron-Effects on Copolymerization of Norbornene with 1-Alkene at Elevated Temperarure", Journal of Polymer Science, Part A: Polymer Chemistry; vol. 54, No. 21; Aug. 2, 2016; pp. 3495-3505.

Masoud, Mamdouh S. et al.; "Structural and thermal studies on some morpholine complexes"; Journal of Molecular Structure; vol. 1175, Aug. 10, 2018; pp. 648-662.

Gomes, Clara S. B. et al.; "Reactivity of cationic α-diimine cyclopentadienyl nickel complexes towards AIEt2Cl: synthesis, characterisation and ethylene polymerisation"; Catalysis Science and Technology; vol. 7, No. 14; Jun. 5, 2017, pp. 3128-3142.

Diamanti, Steve J. et al.; "Ethylene Homopolymerization and Copolymerization with Functionalized 5-Norbornen-2-yl Monomers by a Novel Nickel Catalyst System"; Macromolecules; vol. 36; 2003; pp. 9731-9735.

Azoulay, Jason D. et al.; "Living polymerization of ethylene and a-olefins using a nickel a-keto-b-diimine initiatorw"; Chem. Commun.; 2009; pp. 6177-6179.

Rhinehart, Jennifer L. et al.; "Enhancing α-Diimine Catalysts for High-Temperature Ethylene Polymerization"; ACS Catalysis; vol. 4; 2014, pp. 2501-2504.

Zai, Shaobo et al.; "Longstanding living polymerization of ethylene: substituent effect on bridging carbon of 2-pyridinemethanamine nickel catalysts"; Chem.Commun.; vol. 46; 2010; pp. 4321-4323.

Baruah, Urmilla et al., "Ni/Pd-catalyzed coordination-insertion copolymerization of ethylene with alkyl acrylate", Polymer Bulletin, Dec. 13, 2019, vol. 77, pp. 6105-6134.

* cited by examiner

AMINO-IMINE METAL COMPLEX AND PREPARATION METHOD THEREFOR AND APPLICATION THEREOF

TECHNICAL FIELD

The present invention relates to an amino-imine metal complex, a preparation method therefor and application thereof.

BACKGROUND ART

Compared with other resin materials, polyolefin resins have excellent environmental compatibility, and they are therefore widely used in industry and living goods. Polyethylene resins are important polyolefin resins. Commercial polyethylene catalysts include Ziegler-Natta type catalysts (see, for example, DE Pat 889229 (1953); IT Pat 545332 (1956) and IT Pat 536899 (1955); Chem. Rev., 2000, 100, 1169 and related references therein), Phillips type catalysts (see, for example, Belg. Pat. 530617 (1955); Chem. Rev. 1996, 96, 3327), and metallocene type catalysts (see, for example, W. Kaminsky, Metalorganic Catalysts for Synthesis and Polymerization, Berlin: Springer, 1999), as well as late-transition metal complex type high-efficiency ethylene oligomerization and polymerization catalysts that have been rapidly developed in recent years. For example, in 1995, Brookhart et al. reported a class of α-diimine Ni(II) complexes that can polymerize ethylene at a high activity.

The α-diimine nickel catalysts have attracted much attention because of their high activity and a great adjustability in molecular weight and branching degree of resulting polymers. Companies including Du Pont have filed multiple patent applications (WO 96/23010, WO 98/03521, WO 98/40374, WO 99/05189, WO 99/62968, WO 00/06620, U.S. Pat. Nos. 6,103,658, 6,660,677). Such α-diimine nickel catalysts can catalyze ethylene oligomerization or polymerization at a high activity under the action of methylaluminoxanes or aluminum alkyls at normal temperature or a low temperature. However, when the reaction temperature is increased to above 50° C., the activity of such α-diimide nickel catalysts generally decreases rapidly, and the molecular weight of the prepared polyethylene decreases rapidly as the polymerization temperature increases.

Bazan et al. reported that an α-imine amide nickel catalyst can catalyze the living polymerization of ethylene (Macromolecules, 2003, 36, 9731-9735), and on this basis, an α-keto-β-diimine nickel catalyst was synthesized (Chem. Commun. 2009, 6177-6179). This catalyst is used to catalyze the living polymerization of ethylene and propylene at −10° C. to obtain an olefin product with a molecular weight distribution below 1.1. Long et al. reported that a large sterically hindered α-diimide nickel catalyst can catalyze the living polymerization of ethylene at 60° C. with a molecular weight distribution of 1.11 (ACS Catalysis 2014, 4, 2501-2504). The 2-aminomethylpyridine nickel catalyst developed by Wu Qing's research group at Sun Yat-Sen University can also realize living polymerization of ethylene (Chem. Commun, 2010, 46, 4321-4323).

Among the current manners for living polymerization of ethylene using a late-transition metal catalyst, one is to lower the polymerization temperature to inhibit the occurrence of chain transfer at a low temperature (<5° C.) to achieve living polymerization, and another is to inhibit chain transfer by means of increasing the steric hindrance of the ligand to achieve living polymerization at higher temperatures. However, too low temperature is not suitable for the existing industrial reaction equipment, and too large steric hindrance of the ligand makes the design and synthesis of the catalyst more difficult. Therefore, it is of great significance to develop living polymerization catalysts that are relatively simple to synthesize and are resistant to high temperatures.

DISCLOSURES OF THE INVENTION

An object of the present invention is to overcome the shortcomings of the prior art and provide an amino-imine metal complex with good thermal stability, so as to realize the catalytic polymerization of ethylene at a higher temperature to prepare branched polyethylene with high molecular weight.

In a first aspect, the present invention provides an amino-imine metal complex represented by Formula I:

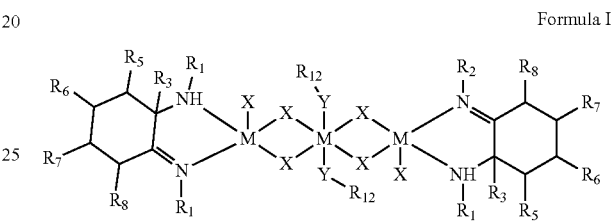

Formula I wherein, $R_1$ and $R_2$ are each independently a C1-C30 hydrocarbyl with or without a substituent Q; each $R_3$ is independently selected from the group consisting of hydrogen and C1-C20 hydrocarbyl with or without a substituent Q; $R_5$ to $R_8$ are each independently selected from the group consisting of hydrogen, halogen, hydroxy, C1-C20 hydrocarbyl with or without a substituent Q, and $R_5$ to $R_8$ groups are optionally joined to form a ring or ring system; each $R_{12}$ is independently a C1-C20 hydrocarbyl with or without a substituent Q; each Y is independently a Group VIA non-metal atom; each M is independently a Group VIII metal; each X is independently selected from the group consisting of halogen, C1-C10 hydrocarbyl with or without a substituent Q and C1-C10 hydrocarbyloxy with or without a substituent Q.

In some embodiments, in Formula I, $R_1$ and $R_2$ are independently selected from the group consisting of C1-C20 alkyl with or without a substituent Q and C6-C20 aryl with or without a substituent Q. Preferably, $R_1$ and/or $R_2$ are/is a group represented by Formula A:

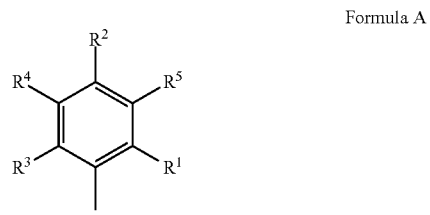

Formula A wherein, $R^1$-$R^5$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkyloxy with or without a substituent Q, C7-C20 alkaryl with or without a substituent Q and C7-C20 alkaryloxy with or without a substituent Q, and $R^1$-$R^5$ are optionally joined to form a ring or ring system. Preferably, $R^1$-$R^5$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q.

In some embodiments, each M is independently selected from the group consisting of nickel and palladium.

In some embodiments, each Y is independently selected from the group consisting of O and S.

In some embodiments, each X is independently selected from the group consisting of halogen, C1-C10 alkyl with or without a substituent Q and C1-C10 alkoxy with or without a substituent Q, and preferably from the group consisting of halogen, C1-C6 alkyl with or without a substituent Q and C1-C6 alkoxy with or without a substituent Q.

In some embodiments, in Formula I, each $R_{12}$ is independently a C1-C20 alkyl with or without a substituent Q, preferably a C1-C10 alkyl with or without a substituent Q, and more preferably a C1-C6 alkyl with or without a substituent Q.

In some embodiments, in Formula I, each $R_3$ is selected from the group consisting of C1-C20 alkyl with or without a substituent Q, C6-C20 aryl with or without a substituent Q, C7-C20 aralkyl with or without a substituent Q and C7-C20 alkaryl with or without a substituent Q. Preferably, each $R_3$ is selected from the group consisting of C1-C10 alkyl with or without a substituent Q, C6-C10 aryl with or without a substituent Q, C7-C15 aralkyl with or without a substituent Q and C7-C15 alkaryl with or without a substituent Q. More preferably, each $R_3$ is a C1-C6 alkyl with or without a substituent Q, such as methyl, ethyl, propyl or butyl.

In some embodiments, the substituent Q is selected from the group consisting of halogen, hydroxy, C1-C10 alkyl, halogenated C1-C10 alkyl, C1-C10 alkoxy and halogenated C1-C10 alkoxy, and preferably from the group consisting of halogen, hydroxy, C1-C6 alkyl, halogenated C1-C6 alkyl, C1-C6 alkoxy and halogenated C1-C6 alkoxy.

Examples of the C1-C6 alkyl include methyl, ethyl, n-propyl, isopropyl, n-butyl, isobutyl, n-pentyl, isopentyl, n-hexyl, isohexyl and 3,3-dimethylbutyl.

Examples of the C1-C6 alkoxy include methoxy, ethoxy, n-propoxy, isopropoxy, n-butoxy, isobutoxy, n-pentoxy, isopentoxy, n-hexoxy, isohexoxy and 3,3-dimethylbutoxy.

The term "halogen" as used herein refers to fluorine, chlorine, bromine or iodine.

In some embodiments, the amino-imine metal complexes according to the present invention are represented by Formula III:

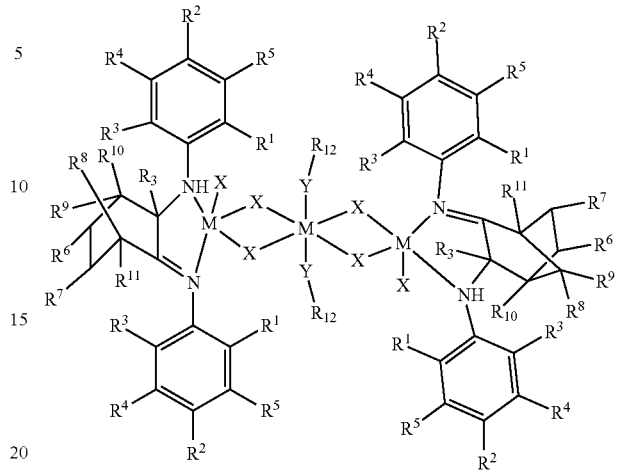

Formula III wherein, $R^1$-$R^{11}$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkyloxy with or without a substituent Q, C7-C20 alkaryl with or without a substituent Q and C7-C20 alkaryloxy with or without a substituent Q; $R_3$, $R_{12}$, Y, M and X are as defined above for Formula I.

In some embodiments, the $R^1$-$R^{11}$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q. Preferably, $R^1$-$R^{11}$ are each independently selected from the group consisting of hydrogen, C1-C10 alkyl, halogenated C1-C10 alkyl, C1-C10 alkoxy, halogenated C1-C10 alkoxy and halogen, and more preferably from the group consisting of hydrogen, C1-C6 alkyl, halogenated C1-C6 alkyl, C1-C6 alkoxy, halogenated C1-C6 alkoxy and halogen.

In some embodiments, the amino-imine metal complex according to the present invention is selected from the group consisting of the complex represented by Formula III, wherein $R^1=R^3$=isopropyl, $R^2=R^4=R^5=R^6=R^7=R^{10}$=H, $R^8=R^9=R^{11}$=CH$_3$, $R_3$=CH$_3$, $R_{12}$=methyl, M=Ni, Y=O, X=Br;

the complex represented by Formula III, wherein $R^1=R^3$=isopropyl, $R^2=R^4=R^5=R^6=R^7=R^{10}$=H, $R^8=R^9=R^{11}$=CH$_3$, $R_3$=ethyl, $R_{12}$=methyl, M=Ni, Y=O, X=Br;

the complex represented by Formula III, wherein $R^1=R^3$=ethyl, $R^2=R^4=R^5=R^6=R^7=R^{10}$=H, $R^8=R^9=R^{11}$=CH$_3$, $R_3$=CH$_3$, $R_{12}$=methyl, M=Ni, Y=O, X=Br;

the complex represented by Formula III, wherein $R^1=R^3$=ethyl, $R^2=R^4=R^5=R^6=R^7=R^{10}$=H, $R^8=R^9=R^{11}$=CH$_3$, $R_3$=ethyl, $R_{12}$=methyl, M=Ni, Y=O, X=Br;

the complex represented by Formula III, wherein $R^1=R^3$=methyl, $R^2=R^4=R^5=R^6=R^7=R^{10}$=H, $R^8=R^9=R^{11}$=CH$_3$, $R_3$=CH$_3$, $R_{12}$=methyl, M=Ni, Y=O, X=Br;

the complex represented by Formula III, wherein $R^1=R^3$=methyl, $R^2=R^4=R^5=R^6=R^7=R^{10}$=H, $R^8=R^9=R^{11}$=CH$_3$, $R_3$=ethyl, $R_{12}$=methyl, M=Ni, Y=O, X=Br;

the complex represented by Formula III, wherein $R^1=R^3$=isopropyl, $R^2=R^4=R^5=R^6=R^7=R^{10}$=H, $R^8=R^9=R^{11}$=CH$_3$, $R_3$=CH$_3$, $R_{12}$=ethyl, M=Ni, Y=O, X=Br;

the complex represented by Formula III, wherein $R^1=R^3$=isopropyl, $R^2=R^4=R^5=R^6=R^7=R^{10}$=H, $R^8=R^9=R^{11}$=CH$_3$, $R_3$=ethyl, $R_{12}$=ethyl, M=Ni, Y=O, X=Br;

the complex represented by Formula III, wherein $R^1=R^3$=ethyl, $R^2=R^4=R^5=R^6=R^7=R^{10}$=H, $R^8=R^9=R^{11}$=CH$_3$, $R_3$=CH$_3$, $R_{12}$=ethyl, M=Ni, Y=O, X=Br;

the complex represented by Formula III, wherein $R^1=R^3$=ethyl, $R^2=R^4=R^5=R^6=R^7=R^{10}$=H, $R^8=R^9=R^{11}$=CH$_3$, $R_3$=ethyl, $R_{12}$=ethyl, M=Ni, Y=O, X=Br;

the complex represented by Formula III, wherein $R^1=R^3$=methyl, $R^2=R^4=R^5=R^6=R^7=R^{10}$=H, $R^8=R^9=R^{11}$=CH$_3$, $R_3$=CH$_3$, $R_{12}$=ethyl, M=Ni, Y=O, X=Br;

the complex represented by Formula III, wherein $R^1=R^3$=methyl, $R^2=R^4=R^5=R^6=R^7=R^{10}$=H, $R^8=R^9=R^{11}$=CH$_3$, $R_3$=ethyl, $R_{12}$=ethyl, M=Ni, Y=O, X=Br;

the complex represented by Formula III, wherein $R^1=R^3$=methyl, $R^2=R^4=R^5=R^6=R^7=R^{10}$=H, $R^8=R^9=R^{11}$=CH$_3$, $R_3$=CH$_3$, $R_{12}$=i-Pr, M=Ni, Y=O, X=Br;

the complex represented by Formula III, wherein $R^1$-$R^3$=methyl, $R^4$-$R^7=R^{10}$=H, $R^8=R^9=R^{11}$=CH$_3$, $R_3$=ethyl, $R_{12}$=ethyl, M=Ni, Y=O, X=Br;

the complex represented by Formula III, wherein $R^1$-$R^3$=methyl, $R^4$-$R^7=R^{10}$=H, $R^8=R^9=R^{11}$=CH$_3$, $R_3$=CH$_3$, $R_{12}$=ethyl, M=Ni, Y=O, X=Br;

the complex represented by Formula III, wherein $R^1=R^3$=methyl, $R^2$=Br, $R^4$-$R^7=R^{10}$=H, $R^8=R^9=R^{11}=R_3$=CH$_3$, $R_{12}$=ethyl, M=Ni, Y=O, X=Br;

the complex represented by Formula III, wherein $R^1=R^3$=methyl, $R^2$=Br, $R^4$-$R^7=R^{10}$=H, $R^8=R^9=R^{11}$=CH$_3$, $R_3$=ethyl, $R_{12}$=ethyl, M=Ni, Y=O, X=Br;

the complex represented by Formula III, wherein $R^1=R^3$=F, $R^2=R^4$-$R^7=R^{10}$=H, $R^8=R^9=R^{11}$=CH$_3$, $R_3$=ethyl, $R_{12}$=ethyl, M=Ni, Y=O, X=Br;

the complex represented by Formula III, wherein $R^1=R^3$=Cl, $R^2=R^4$-$R^7=R^{10}$=H, $R^8=R^9=R^{11}$=CH$_3$, $R_3$=ethyl, $R_{12}$=ethyl, M=Ni, Y=O, X=Br;

the complex represented by Formula III, wherein $R^1=R^3$=Br, $R^2=R^4$-$R^7=R^{10}$=H, $R^8=R^9=R^{11}$=CH$_3$, $R_3$=ethyl, $R_{12}$=ethyl, M=Ni, Y=O, X=Br;

the complex represented by Formula III, wherein $R^1=R^3$=methyl, $R^2=R^4$-$R^7=R^{10}$=H, $R^8=R^9=R^{11}$=CH$_3$, $R_3$=ethyl, $R_{12}$=isobutyl, M=Ni, Y=O, X=Br;

the complex represented by Formula III, wherein $R^1=R^1$=ethyl, $R^2=R^4$-$R^7=R^{10}$=H, $R^8=R^9=R^{11}$=CH$_3$, $R_3$=CH$_3$, $R_{12}$=isobutyl, M=Ni, Y=O, X=Br;

the complex represented by Formula III, wherein $R^1=R^3$=isopropyl, $R^2=R^4$-$R^7=R^{10}$=H, $R^8=R^9=R^{11}$=CH$_3$, $R_3$=CH$_3$, $R_{12}$=isobutyl, M=Ni, Y=O, X=Br;

the complex represented by Formula III, wherein $R^1$-$R^3$=methyl, $R^4$-$R^7=R^{10}$=H, $R^8=R^9=R^{11}$=CH$_3$, $R_3$=CH$_3$, $R_{12}$=isobutyl, M=Ni, Y=O, X=Br;

the complex represented by Formula III, wherein $R^1=R^3$=methyl, $R^2$=Br, $R^4$-$R^7=R^{10}$=H, $R^8=R^9=R^{11}$=methyl, $R_3$=isopropyl, $R_{12}$=isobutyl, M=Ni, Y=O, X=Br;

the complex represented by Formula III, wherein $R^1=R^3$=F, $R^2=R^4$-$R^7=R^{10}$=H, $R^8=R^9=R^{11}$=CH$_3$, $R_3$=isopropyl, $R_{12}$=isobutyl, M=Ni, Y=O, X=Br;

the complex represented by Formula III, wherein $R^1=R^3$=Cl, $R^2=R^4$-$R^7=R^{10}$=H, $R^8=R^9=R^{11}$=CH$_3$, $R_3$=isopropyl, $R_{12}$=isobutyl, M=Ni, Y=O, X=Br;

the complex represented by Formula III, wherein $R^1=R^3$=Br, $R^2=R^4$-$R^7=R^{10}$=H, $R^8=R^9=R^{11}$=CH$_3$, $R_3$=isopropyl, $R_{12}$=isobutyl, M=Ni, Y=O, X=Br;

the complex represented by Formula III, wherein $R^1=R^3$=methyl, $R^2=R^4$-$R^7=R^{10}$=H, $R^8=R^9$=CH$_3$, $R^{11}$=bromomethyl, $R_3$=isopropyl, $R_{12}$=ethyl, M=Ni, Y=O, X=Br;

the complex represented by Formula III, wherein $R^1=R^3$=ethyl, $R^2=R^4$-$R^7=R^{10}$=H, $R^8=R^9$=CH$_3$, $R^{11}$=CH$_2$Br, $R_3$=isopropyl, $R_{12}$=ethyl, M=Ni, Y=O, X=Br;

the complex represented by Formula III, wherein $R^1=R^3$=isopropyl, $R^2=R^4$-$R^7=R^{10}$=H, $R^8=R^9$=CH$_3$, $R^{11}$=CH$_2$Br, $R_3$=ethyl, $R_{12}$=ethyl, M=Ni, Y=O, X=Br;

the complex represented by Formula III, wherein $R^1$-$R^3$=methyl, $R^4$-$R^1=R^{10}$=H, $R^8=R^9$=CH$_3$, $R^{11}$=CH$_2$Br, $R_{12}$=ethyl, M=Ni, Y=O, X=Br;

the complex represented by Formula III, wherein $R^1=R^3$=methyl, $R^2$=Br, $R^4$-$R^7=R^{10}$=H, $R^8=R^9$=methyl, $R_3$=ethyl, $R^{11}$=CH$_2$Br, $R_{12}$=ethyl, M=Ni, Y=O, X=Br;

the complex represented by Formula III, wherein $R^1=R^3$=F, $R^2=R^4$-$R^7=R^{10}$=H, $R^8=R^9$=methyl, $R^{11}$=CH$_2$Br, $R_3$=isobutyl, $R_{12}$=ethyl, M=Ni, Y=O, X=Br;

the complex represented by Formula III, wherein $R^1=R^3$=Cl, $R^2=R^4$-$R^1=R^{10}$=H, $R_8=R^9$=methyl, $R^{11}$=CH$_2$Br, $R_3$=isobutyl, $R_{12}$=ethyl, M=Ni, Y=O, X=Br;

the complex represented by Formula III, wherein $R^1=R^3$=Br, $R^2=R^4$-$R^7=R^{10}$=H, $R_8=R^9$=methyl, $R^{11}$=CH$_2$Br, $R_3$=isobutyl, $R_{12}$=ethyl, M=Ni, Y=O, X=Br.

In a sub-aspect, the amino-imine metal complex according to the present invention has a structure as shown by Formula IV:

Formula IV

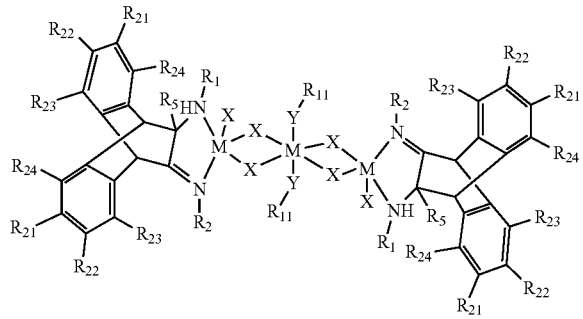

wherein, $R_1$ and $R_2$ are each independently a C1-C30 hydrocarbyl with or without a substituent Q; $R_{21}$-$R_{24}$ are each independently selected from the group consisting of hydrogen, halogen, hydroxy, C1-C20 hydrocarbyl with or without a substituent Q and C1-C20 hydrocarbyloxy with or without a substituent Q, and $R_{21}$-$R_{24}$ are optionally joined to form a ring or ring system, preferably a substituted or unsubstituted benzene ring; each $R_5$ is independently selected from the group consisting of hydrogen and C1-C20 hydrocarbyl with or without a substituent Q; each $R_{11}$ is independently a C1-C20 hydrocarbyl with or without a substituent Q; each Y is independently a Group VIA non-metal atom; each M is independently a Group VIII metal; each X is independently selected from the group consisting of halogen, C1-C10 hydrocarbyl with or without a substituent Q and C1-C10 hydrocarbyloxy with or without a substituent Q.

The term "substituted" as used herein refers to substitution by a substituent Q, for example.

In some embodiments of this subaspect, the $R_1$ and $R_2$ are independently selected from the group consisting of C1-C20 alkyl with or without a substituent Q and C6-C20 aryl with or without a substituent Q. Preferably, $R_1$ and/or $R_2$ are/is a group represented by Formula A:

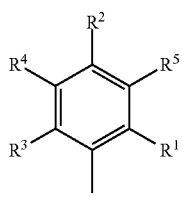

Formula A wherein, $R^1$-$R^5$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q. C2-C20 alkynoxy with or without a substituent Q, C6-C20 aryl with or without a substituent Q, C6-C20 aryloxy with or without a substituent Q, C7-C20 aralkyl with or without a substituent Q. C7-C20 aralkyloxy with or without a substituent Q, C7-C20 alkaryl with or without a substituent Q and C7-C20 alkaryloxy with or without a substituent Q, and $R^1$-$R^5$ are optionally joined to form a ring or ring system. Preferably, $R^1$-$R^5$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C6-C15 aryloxy with or without a substituent Q. C7-C15 aralkyl with or without a substituent Q, C7-C15 aralkoxy with or without a substituent Q, C7-C15 alkaryl with or without a substituent Q and C7-C15 alkaryloxy with or without a substituent Q. More preferably, $R^1$-$R_5$ are each independently selected from the group consisting of hydrogen, halogen, hydroxy, C1-C6 alkyl with or without a substituent Q. C2-C6 alkenyl with or without a substituent Q, C2-C6 alkynyl with or without a substituent Q, C1-C6 alkoxy with or without a substituent Q, C2-C6 alkenyloxy with or without a substituent Q, C2-C6 alkynyloxy with or without a substituent Q, C6-C10 aryl with or without a substituent Q, C7-C10 aralkyl group with or without a substituent Q, C7-C10 alkaryl with or without a substituent Q, C6-C10 aryloxy with or without a substituent Q, C7-C10 aralkyloxy with or without a substituent Q, and C7-C10 alkaryloxy with or without a substituent Q.

In some embodiments of this subaspect, each M is independently selected from the group consisting of nickel and palladium.

In some embodiments of this subaspect, each Y is independently selected from the group consisting of O and S.

In some embodiments of this subaspect, each X is independently selected from the group consisting of halogen, C1-C10 alkyl with or without a substituent Q and C1-C10 alkoxy with or without a substituent Q, and preferably from the group consisting of halogen, C1-C6 alkyl with or without a substituent Q and C1-C6 alkoxy with or without a substituent Q.

In some embodiments of this subaspect, each $R_{11}$ is independently a C1-C20 alkyl with or without a substituent Q, preferably a C1-C10 alkyl with or without a substituent Q, and more preferably a C1-C6 alkyl with or without a substituent Q.

In some embodiments of this subaspect, each $R_5$ is independently selected from the group consisting of C1-C20 alkyl with or without a substituent Q, C6-C20 aryl with or without a substituent Q, C7-C20 aralkyl with or without a substituent Q and C7-C20 alkaryl with or without a substituent Q. Preferably, each $R_5$ is independently selected from the group consisting of C1-C10 alkyl with or without a substituent Q, C6-C10 aryl with or without a substituent Q, C7-C15 aralkyl with or without a substituent Q and C7-C15 alkaryl with or without a substituent Q. More preferably, each $R_5$ is independently a C1-C6 alkyl with or without a substituent Q, such as methyl, ethyl, propyl or butyl.

In some embodiments of this subaspect, the substituent Q is selected from the group consisting of halogen, hydroxy, C1-C10 alkyl, halogenated C1-C10 alkyl, C1-C10 alkoxy and halogenated C1-C10 alkoxy, and preferably from the group consisting of halogen, hydroxy, C1-C6 alkyl, halogenated C1-C6 alkyl, C1-C6 alkoxy and halogenated C1-C6 alkoxy. Preferably, the C1-C6 alkyl is selected from methyl, ethyl, n-propyl, isopropyl, n-butyl, isobutyl, n-pentyl, isopentyl, n-hexyl, isohexyl and 3,3-dimethylbutyl. Preferably, the C1-C6 alkoxy is selected from methoxy, ethoxy, n-propoxy, isopropoxy, n-butoxy, isobutoxy, n-pentoxy, isopentoxy, n-hexyloxy, isohexyloxy and 3,3-dimethylbutoxy.

In some embodiments of this subaspect, $R_{21}$-$R_{24}$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C7-C20 aralkyl with or without a substituent Q, C7-C20 alkaryl with or without a substituent Q, C6-C20 aryloxy with or without a substituent Q, C7-C20 aralkyloxy with or without a substituent Q and C7-C20 alkaryloxy with or without a substituent Q, and $R_{21}$-$R_{24}$ are optionally joined to form a ring or ring system. Preferably, $R_2$-$R_{24}$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C7-C15 aralkyl with or without a substituent Q, C7-C15 alkaryl with or without a substituent Q, C6-C15 aryloxy with or without a substituent Q, C7-C15 aralkoxy with or without a substituent Q and C7-C15 alkaryloxy with or without a substituent Q. More preferably, $R_{21}$-$R_{24}$ are each independently selected from the group consisting of hydrogen, C1-C10 alkyl, halogenated C1-C10 alkyl, C1-C10 alkoxy, halogenated C1-C10 alkoxy and halogen, and more preferably from the group consisting of hydrogen, C1-C6 alkyl, halogenated C1-C6 alkyl, C1-C6 alkoxy, halogenated C1-C6 alkoxy and halogen.

In some embodiments of this subaspect, the amino-imine metal complex according to the present invention has a structure as shown by Formula IVa:

Formula IVa

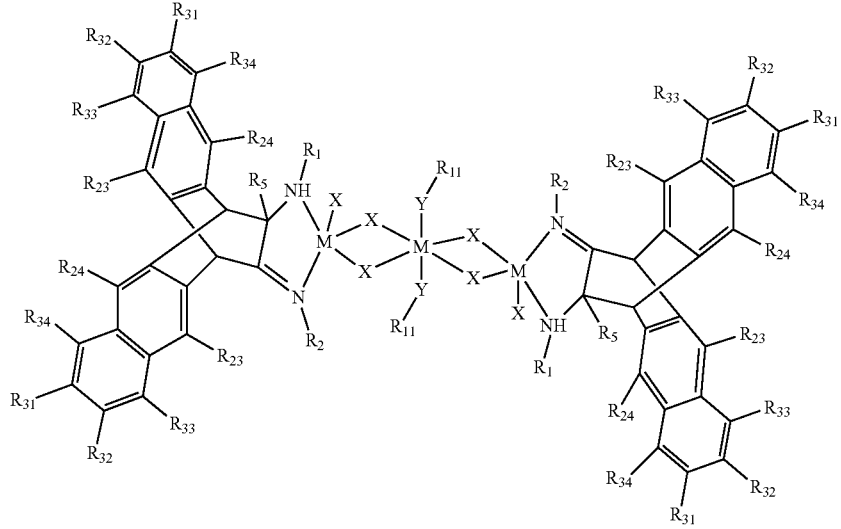

wherein $R_{31}$-$R_{34}$ have the same meanings as $R_{21}$-$R_{24}$ in Formula IV, preferably $R_{33}$ and $R_{34}$ are hydrogen, and $R_1$, $R_2$, $R_5$, $R_{11}$, Y, M and X are as defined above for Formula IV.

In some embodiments of this subaspect, the amino-imine metal complex according to the present invention is represented by the following Formula V or Formula V':

Formula V

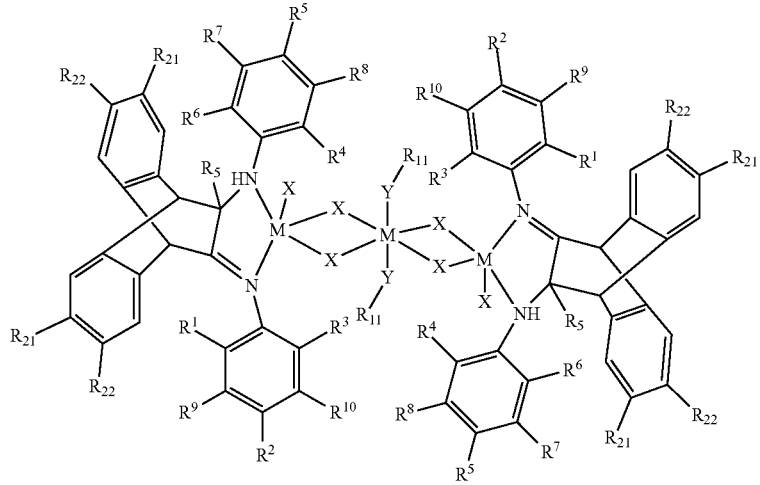

-continued

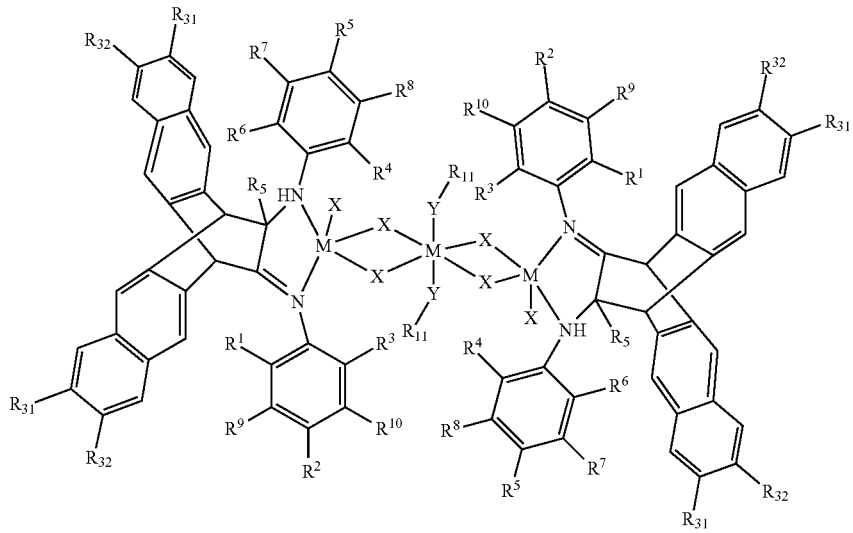

Formula V' wherein the individual symbols are as defined above.

In some embodiments of this subaspect, the amino-imine metal complex according to the present invention is selected from the group consisting of 1) the complex represented by Formula V, wherein $R^1=R^3=R^4=R^6=$isopropyl, $R^2=R^5=R^7-R^{10}=R_{21}=R_{22}=$H, $R_5=$CH$_3$, $R_{11}=$ethyl, M=Ni, Y=O, X=Br;
2) the complex represented by Formula V, wherein $R^1=R^3=R^4=R^6=$ethyl, $R^2=R^5=R^7-R^{10}=R_{21}=R_{22}=$H, $R_5=$CH$_3$, $R_{11}=$ethyl, M=Ni, Y=O, X=Br;
3) the complex represented by Formula V, wherein $R^1=R^3=R^4=R^6=$methyl, $R^2=R^5=R^7-R^{10}=R_{21}=R_{22}=$H, $R_5=$CH$_3$, $R_{11}=$ethyl, M=Ni, Y=O, X=Br;
4) the complex represented by Formula V, wherein $R^1-R^6=$methyl, $R^7-R^{10}=R_{21}=R_{22}=$H, $R_5=$CH$_3$, $R_{11}=$ethyl, M=Ni, Y=O, X=Br;
5) the complex represented by Formula V, wherein $R^1=R^3=R^4=R^6=$Br, $R^2=R^5=R^7-R^{10}=R_{21}=R_{22}=$H, $R_5=$CH$_3$, $R_{11}=$ethyl, M=Ni, Y=O, X=Br;
6) the complex represented by Formula V, wherein $R^1=R^3=R^4=R^6=$Cl, $R^2=R^5=R^7-R^{10}=R_{21}=R_{22}=$H, $R_5=$CH$_3$, $R_{11}=$ethyl, M=Ni, Y=O, X=Br;
7) the complex represented by Formula V, wherein $R^1=R^3=R^4=R^6=$F, $R^2=R^5=R^7-R^{10}=R_{21}=R_{22}=$H, $R_5=$CH$_3$, $R_{11}=$ethyl, M=Ni, Y=O, X=Br;
8) the complex represented by Formula V, wherein $R^1=R^3=R^4=R^6=$isopropyl, $R^2=R^5=R^7-R^{10}=R_{21}=R_{22}=$H, $R_5=R_{11}=$ethyl, M=Ni, Y=O, X=Br;
9) the complex represented by Formula V, wherein $R^1=R^3=R^4=R^6=$ethyl, $R^2=R^5=R^7-R^{10}=R_{21}=R_{22}=$H, $R_5=R_{11}=$ethyl, M=Ni, Y=O, X=Br;
10) the complex represented by Formula V, wherein $R^1=R^3=R^4=R^6=$methyl, $R^2=R^5=R^7-R^{10}=R_{21}=R_{22}=$H, $R_5=R_{11}=$ethyl, M=Ni, Y=O, X=Br;
11) the complex represented by Formula V, wherein $R^1-R^6=$methyl, $R^7-R^{10}=R_{21}=R_{22}=$H, $R_5=R_{11}=$ethyl, M=Ni, Y=O, X=Br;
12) the complex represented by Formula V, wherein $R^1=R^3=R^4=R^6=$Br, $R_2=R^5=R^7-R^{10}=R_{21}=R_{22}=$H, $R_5=R_{11}=$ethyl, M=Ni, Y=O, X=Br;
13) the complex represented by Formula V, wherein $R^1=R^3=R^4=R^6=$Cl, $R^2=R^5=R^7-R^{10}=R_{21}=R_{22}=$H, $R_5=R_{11}=$ethyl, M=Ni, Y=O, X=Br;
14) the complex represented by Formula V, wherein $R^1=R^3=R^4=R^6=$F, $R^2=R^5=R^7-R^{10}=R_{21}=R_{22}=$H, $R_5=R_{11}=$ethyl, M=Ni, Y=O, X=Br;
15) the complex represented by Formula V, wherein $R^1=R^3=R^4=R^6=$isopropyl, $R^2=R^5=R^7-R^{10}=R_{21}=R_{22}=$H, $R_5=$CH$_3$, $R_{11}=$isobutyl, M=Ni, Y=O, X=Br;
16) the complex represented by Formula V, wherein $R^1=R^3=R^4=R^6=$ethyl, $R^2=R^5=R^7-R^{10}=R_{21}=R_{22}=$H, $R_5=$CH$_3$, $R_{11}=$isobutyl, M=Ni, Y=O, X=Br;
17) the complex represented by Formula V, wherein $R^1=R^3=R^4=R^6=$methyl, $R^2=R^5=R^7-R^{10}=R_{21}=R_{22}=$H, $R_5=$CH$_3$, $R_{11}=$isobutyl, M=Ni, Y=O, X=Br;
18) the complex represented by Formula V, wherein $R^1-R^6=$methyl, $R^7-R^{10}=R_{21}=R_{22}=$H, $R_5=$CH$_3$, $R_{11}=$isobutyl, M=Ni, Y=O, X=Br;
19) the complex represented by Formula V, wherein $R^1=R^3=R^4=R^6=$Br, $R_2=R^5=R^7-R^{10}=R_{21}=R_{22}=$H, $R_5=$CH$_3$, $R_{11}=$isobutyl, M=Ni, Y=O, X=Br;
20) the complex represented by Formula V, wherein $R^1=R^3=R^4=R^6=$Cl, $R_2=R^5=R^7-R^{10}=R_{21}=R_{22}=$H, $R_5=$CH$_3$, $R_{11}=$isobutyl, M=Ni, Y=O, X=Br;
21) the complex represented by Formula V, wherein $R^1=R^3=R^4=R^6=$F, $R^2=R^5=R^7-R^{10}=R_{21}=R_{22}=$H, $R_5=$CH$_3$, $R_{11}=$isobutyl, M=Ni, Y=O, X=Br;
22) the complex represented by Formula V, wherein $R^1=R^3=R^4=R^6=$isopropyl, $R^2=R^5=R^7-R^{10}=R_{22}=$H, $R_2=$tert-butyl, $R_5=$CH$_3$, $R_{11}=$ethyl, M=Ni, Y=O, X=Br;
23) the complex represented by Formula V, wherein $R^1=R^3=R^4=R^6=$ethyl, $R^2=R^5=R^7-R^1=R_{22}=$H, $R_{21}=$tert-butyl, $R_5=$CH$_3$, $R_{11}=$ethyl, M=Ni, Y=O, X=Br;
24) the complex represented by Formula V, wherein $R^1=R^3=R^4=R^6=$methyl, $R^2=R^5=R^7-R^{10}=R_{22}=$H, $R_2=$tert-butyl, $R_5=$CH$_3$, $R_{11}=$ethyl, M=Ni, Y=O, X=Br;
25) the complex represented by Formula V, wherein $R^1-R^6=$methyl, $R^7-R^{10}=R_{22}=$H, $R_{21}=$tert-butyl, $R_5=$CH$_3$, $R_{11}=$ethyl, M=Ni, Y=O, X=Br;

26) the complex represented by Formula V, wherein $R^1=R^3=R^4=R^6$=Br, $R_2=R^5=R^7\text{-}R^{10}=R_{22}$=H, $R_{21}$=tert-butyl, $R_5$=CH$_3$, $R_1$=ethyl, M=Ni, Y=O, X=Br;
27) the complex represented by Formula V, wherein $R^1=R^3=R^4=R^6$=Cl, $R^2=R^5=R^7\text{-}R^{10}=R_{22}$=H, $R_{21}$=tert-butyl, $R_5$=CH$_3$, $R_{11}$=ethyl, M=Ni, Y=O, X=Br;
28) the complex represented by Formula V, wherein $R^1=R^3=R^4=R^6$=F, $R^2=R^5=R^7\text{-}R^{10}=R_{22}$=H, $R_{21}$=tert-butyl, $R_5$=CH$_3$, $R_{11}$=ethyl, M=Ni, Y=O, X=Br;
29) the complex represented by Formula V, wherein $R^1=R^3=R^4=R^6$=isopropyl, $R^2=R^5=R^7\text{-}R^{10}=R_{22}$=H, $R_{21}$=tert-butyl, $R_5$=CH$_3$, $R_{11}$=isobutyl, M=Ni, Y=O, X=Br;
30) the complex represented by Formula V, wherein $R^1=R^3=R^4=R^6$=ethyl, $R^2=R^5=R^7\text{-}R^{10}=R_{22}$=H, $R_{21}$=tert-butyl, $R_5$=CH$_3$, $R_{11}$=isobutyl, M=Ni, Y=O, X=Br;
31) the complex represented by Formula V, wherein $R^1=R^3=R^4=R^6$=methyl, $R^2=R^5=R^7\text{-}R^{10}=R_{22}$=H, $R_{21}$=tert-butyl, $R_5$=CH$_3$, $R_{11}$=isobutyl, M=Ni, Y=O, X=Br;
32) the complex represented by Formula V, wherein $R^1\text{-}R^6$=methyl, $R^7\text{-}R^{10}=R_{22}$=H, $R_{21}$=tert-butyl, $R_5$=CH$_3$, $R_{11}$=isobutyl, M=Ni, Y=O, X=Br;
33) the complex represented by Formula V, wherein $R^1=R^3=R^4=R^6$=Br, $R^2=R^5=R^7\text{-}R^{10}=R_{22}$=H, $R_{21}$=tert-butyl, $R_5$=CH$_3$, $R_{11}$=isobutyl, M=Ni, Y=O, X=Br;
34) the complex represented by Formula V, wherein $R^1=R^3=R^4=R^6$=Cl, $R^2=R^5=R^7\text{-}R^{10}=R_{22}$=H, $R_{21}$=tert-butyl, $R_5$=CH$_3$, $R_1$=isobutyl, M=Ni, Y=O, X=Br;
35) the complex represented by Formula V, wherein $R^1=R^3=R^4=R^6$=F, $R^2=R^5=R^7\text{-}R^{10}=R_{22}$=H, $R_{21}$=tert-butyl, $R_5$=CH$_3$, $R_{11}$=isobutyl, M=Ni, Y=O, X=Br;
36) the complex represented by Formula V', wherein $R^1=R^3=R^4=R^6$=isopropyl, $R^2=R^5=R^7\text{-}R^{10}=R_{31}=R_{32}$=H, $R_5$=CH$_3$, $R_{11}$=ethyl, M=Ni, Y=O, X=Br;
37) the complex represented by Formula V', wherein $R^1=R^3=R^4=R^6$=ethyl, $R^2=R^5=R^7\text{-}R^{10}=R_{31}=R_{32}$=H, $R_5$=CH$_3$, $R_{11}$=ethyl, M=Ni, Y=O, X=Br;
38) the complex represented by Formula V', wherein $R^1=R^3=R^4=R^6$=methyl, $R^2=R^5=R^7\text{-}R^{10}=R_{31}=R_{32}$=H, $R_5$=CH$_3$, $R_{11}$=ethyl, M=Ni, Y=O, X=Br;
39) the complex represented by Formula V', wherein $R^1\text{-}R^6$=methyl, $R^7\text{-}R^{10}=R_{31}=R_{32}$=H, $R_5$=CH$_3$, $R_{11}$=ethyl, M=Ni, Y=O, X=Br;
40) the complex represented by Formula V', wherein $R^1=R^3=R^4=R^6$=Br, $R^2=R^5=R^7\text{-}R^{10}=R_{31}=R_{32}$=H, $R_5$=CH$_3$, $R_{11}$=ethyl, M=Ni, Y=O, X=Br;
41) the complex represented by Formula V', wherein $R^1=R^3=R^4=R^6$=Cl, $R^2=R^5=R^7\text{-}R^{10}=R_{31}=R_{32}$=H, $R_5$=CH$_3$, $R_{11}$=ethyl, M=Ni, Y=O, X=Br;
42) the complex represented by Formula V', wherein $R^1=R^3=R^4=R^6$=F, $R^2=R^5=R^7\text{-}R^{10}=R_{31}=R_{32}$=H, $R_5$=CH$_3$, $R_{11}$=ethyl, M=Ni, Y=O, X=Br;
43) the complex represented by Formula V', wherein $R^1=R^3=R^4=R^6$=isopropyl, $R^2=R_8=R^7\text{-}R^{11}=R_{31}=R_{32}$=H, $R_5$=CH$_3$, $R_{11}$=isobutyl, M=Ni, Y=O, X=Br;
44) the complex represented by Formula V', wherein $R^1=R^3=R^4=R^6$=ethyl, $R^2=R^5=R^7\text{-}R^{10}=R_{31}=R_{32}$=H, $R_5$=CH$_3$, $R_{11}$=isobutyl, M=Ni, Y=O, X=Br;
45) the complex represented by Formula V', wherein $R^1=R^3=R^4=R^6$=methyl, $R^2=R^5=R^7\text{-}R^{11}=R_{31}=R_{32}$=H, $R_5$=CH$_3$, $R_{11}$=isobutyl, M=Ni, Y=O, X=Br;
46) the complex represented by Formula V', wherein $R^1\text{-}R^6$=methyl, $R^7\text{-}R^{10}=R_{31}=R_{32}$=H, $R_5$=CH$_3$, $R_{11}$=isobutyl, M=Ni, Y=O, X=Br;
47) the complex represented by Formula V', wherein $R^1=R^3=R^4=R^6$=Br, $R^2=R^5=R^7\text{-}R^{10}=R_{31}=R_{32}$=H, $R_5$=CH$_3$, $R_{11}$=isobutyl, M=Ni, Y=O, X=Br;
48) the complex represented by Formula V', wherein $R^1=R^3=R^4=R^6$=Cl, $R^2=R^5=R^7\text{-}R^{10}=R_{31}=R_{32}$=H, $R_5$=CH$_3$, $R_{11}$=isobutyl, M=Ni, Y=O, X=Br;
49) the complex represented by Formula V', wherein $R^1=R^3=R^4=R^6$=F, $R^2=R^5=R^7\text{-}R^{10}=R_{31}=R_{32}$=H, $R_5$=CH$_3$, $R_{11}$=isobutyl, M=Ni, Y=O, X=Br;
50) the complex represented by Formula V', wherein $R^1=R^3=R^4=R^6$=isopropyl, $R^2=R^5=R^7\text{-}R^{10}$=H $R_{31}=R_{32}=R_{11}$=ethyl, $R_5$=CH$_3$, M=Ni, Y=O, X=Br;
512) the complex represented by Formula V', wherein $R^1=R^3=R^4=R^6$=ethyl, $R^2=R^5=R^7\text{-}R^{10}$=H, $R_{31}=R_{32}=R_{11}$=ethyl, $R_5$=CH$_3$, M=Ni, Y=O, X=Br;
52) the complex represented by Formula V', wherein $R^1=R^3=R^4=R^6$=methyl, $R^2=R^5=R^7\text{-}R^{10}$=H, $R_{31}=R_{32}=R_{11}$=ethyl, $R_5$=CH$_3$, M=Ni, Y=O, X=Br;
53) the complex represented by Formula V', wherein $R^1\text{-}R^6$=methyl, $R^7\text{-}R^{10}$=H, $R_{31}=R_{32}=R_{11}$=ethyl, $R_5$=CH$_3$, M=Ni, Y=O, X=Br;
54) the complex represented by Formula V', wherein $R^1=R^3=R^4=R^6$=Br, $R^2=R^5=R^7\text{-}R^{10}$=H, $R_{31}=R_{32}=R_{11}$=ethyl, $R_5$=CH$_3$, M=Ni, Y=O, X=Br;
55) the complex represented by Formula V', wherein $R^1=R^3=R^4=R^6$=Cl, $R^2=R^5=R^7\text{-}R^{10}$=H, $R_{31}=R_{32}=R_{11}$=ethyl, $R_5$=CH$_3$, M=Ni, Y=O, X=Br;
56) the complex represented by Formula V', wherein $R^1=R^3=R^4=R^6$=F, $R^2=R^5=R^7\text{-}R^{10}$=H, $R_{31}=R_{32}=R_{11}$=ethyl, $R_5$=CH$_3$, M=Ni, Y=O, X=Br;
57) the complex represented by Formula V', wherein $R^1=R^3=R^4=R^6$=isopropyl, $R^2=R^5=R^7\text{-}R^{10}$=H, $R_{31}=R_{32}=R_{11}$=ethyl, $R_5$=CH$_3$, M=Ni, Y=O, X=Br;
58) the complex represented by Formula V', wherein $R^1=R^3=R^4=R^6$=ethyl, $R^2=R^5=R^7\text{-}R^{10}$=H, $R_{31}=R_{32}$=ethyl, $R_5$=CH$_3$, $R_{11}$=isobutyl, M=Ni, Y=O, X=Br;
59) the complex represented by Formula V', wherein $R^1=R^3=R^4=R^6$=methyl, $R^2=R^5=R^7\text{-}R^{10}$=H, $R_{31}=R_{32}$=ethyl, $R_5$=CH$_3$, $R_{11}$=isobutyl, M=Ni, Y=O, X=Br;
60) the complex represented by Formula V', wherein $R^1\text{-}R^6$=methyl, $R_7\text{-}R^{10}$=H, $R_{31}=R_{32}$=ethyl, $R_5$=CH$_3$, $R_{11}$=isobutyl, M=Ni, Y=O, X=Br;
61) the complex represented by Formula V', wherein $R^1=R^3=R^4=R^6$=Br, $R^2=R^5=R^7\text{-}R^{10}$=H, $R_{31}=R_{32}$=ethyl, $R_5$=CH$_3$, $R_{11}$=isobutyl, M=Ni, Y=O, X=Br;
62) the complex represented by Formula V', wherein $R^1=R^3=R^4=R^6$=Cl, $R^2=R^5=R^7\text{-}R^{10}$=H, $R_{31}=R_{32}$=ethyl, $R_5$=CH$_3$, $R_{11}$=isobutyl, M=Ni, Y=O, X=Br;
63) the complex represented by Formula V', wherein $R^1=R^3=R^4=R^6$=F, $R^2=R^5=R^7\text{-}R^{10}$=H, $R_{31}=R_{32}$=ethyl, $R_5$=CH$_3$, $R_{11}$=isobutyl, M=Ni, Y=O, X=Br.

In a second aspect, the present invention provides a method for preparing the amino-imine metal complex, comprising step 1) reacting an amino-imine compound represented by Formula VI with $MX_n$ and $R_{12}YH$ to generate the amino-imine metal complex represented by Formula I, Formula VI

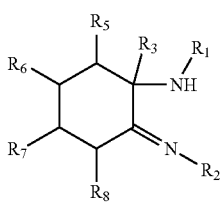

Formula I

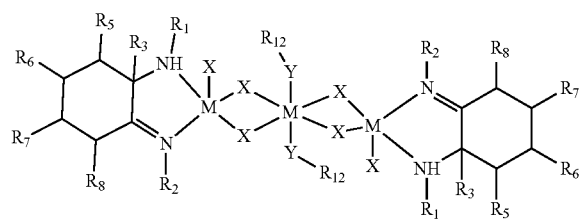

wherein R$_1$, R$_2$, R$_3$ and R$_5$-R$_8$ in Formula VI have the same definitions as in Formula I;

M and X in MX$_n$ have the same definitions as in Formula I, and n is the number of X satisfying the valence state of M;

Y and R$_{12}$ in R$_{12}$YH have the same definitions as in Formula I.

According to some embodiments of the present invention, the amino-imine compound represented by Formula VI is as shown by the following Formula VIa:

Formula VIa

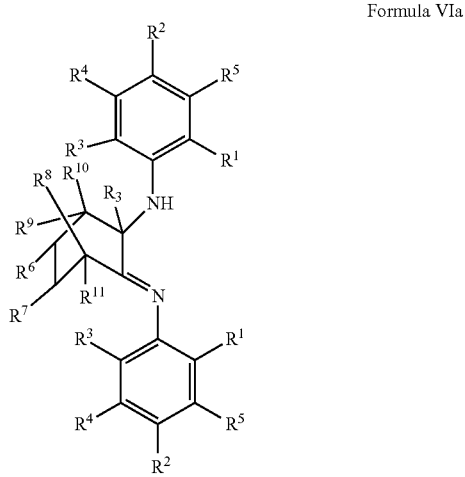

wherein, R$^1$-R$^{11}$ and R$_3$ have the same meanings as defined for Formula III.

According to some embodiments of the present invention, the preparation of the amino-imine compound represented by Formula VI comprises step 2) reacting a diketone compound represented by Formula VII with A(R$_3$)$_a$ and an amine compound, to generate the amino-imine compound represented by Formula VI, with the amine compound being R$_1$NH$_2$ and R$_2$NH$_2$;

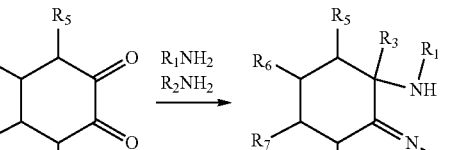

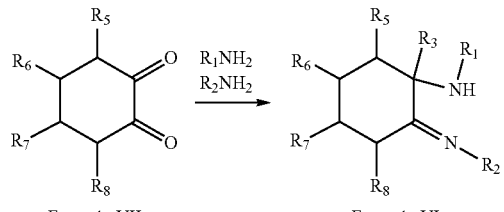

wherein, R$_1$, R$_2$, R$_3$, and R$_5$-R$_8$ have the same definitions as in Formula I, A is one or more selected from aluminum, zinc, lithium and magnesium. Preferably, a molar ratio of A(R$_3$)$_a$ to the amine compound is greater than or equal to 2.0, preferably from 2.0 to 6.0, and more preferably from 3.0 to 6.0.

According to some embodiments of the present invention, the diketone compound represented by Formula VII is represented by the following Formula VIIa:

Formula VIIa

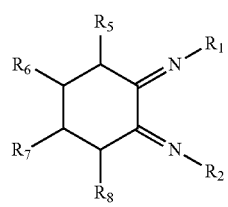

wherein R$^6$-R$^{11}$ have the same definitions as in Formula III.

According to some embodiments of the present invention, the reaction in step 1) is carried out in an organic solvent, and the organic solvent is preferably a halogenated alkane, more preferably the organic solvent is one or more selected from dichloromethane, trichloromethane and 1,2-dichloroethane.

According to some embodiments of the present invention, the reaction in step 2) is carried out in an aprotic solvent. Preferably, the aprotic solvent is one or more of toluene, benzene, and xylenes.

According to some embodiments of the present invention, the preparation of the amino-imine compound represented by Formula VI comprises contacting and reacting a diimine compound represented by Formula VIII with A(R$_3$)$_a$ or a Grignard reagent to generate the amino-imine compound represented by Formula VI, Formula VIII wherein R$_1$, R$_2$, and R$_5$-R$_8$ in Formula VIII have the same definitions as in Formula I;

in the A(R$_3$)$_a$, A is one or more selected from aluminum, zinc, lithium and magnesium, R$_3$ has the same definitions as in Formula I, a is the number of R$_3$ that satisfies the valence state of A;

and the Grignard reagent has a general formula of $R_3MgX$, wherein $R_3$ has the same definitions as in Formula I, and X is a halogen, and preferably bromine and/or chlorine.

According to some embodiments of the present invention, the diimine compound represented by Formula VIII is represented the following Formula VIIIa:

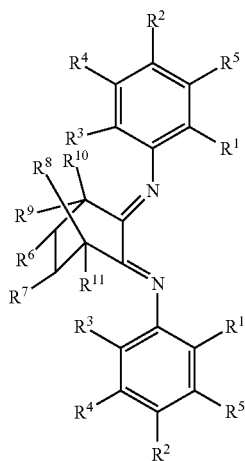

Formula VIIIa wherein $R^1$-$R^{11}$ have the same definition as in Formula III.

According to some embodiments of the present invention, the preparation method comprises a first reflux reaction of an amine compound represented by Formula (a) with $A(R_3)_a$ in a solvent, and then a second reflux reaction with a diketone compound represented by Formula VIIa to form a compound represented by Formula VIa,

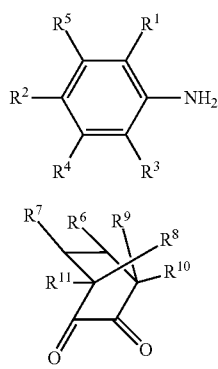

Formula (a)

Formula VIIa

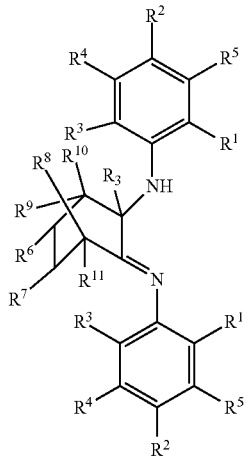

Formula VIa

According to a preferred embodiment of the present invention, examples of the amine compound may include 2,6-dimethylaniline, 2,6-diethylaniline, 2,6-diisopropylaniline, 2,4,6-trimethylaniline, 2,4,6-triethylaniline, 2,4,6-triisopropylaniline, 2,6-difluoroaniline, 2,6-dibromoaniline, 2,6-dichloroaniline, and 2,6-dimethyl-4-bromoaniline.

According to a preferred embodiment of the present invention, the amine compound and the $A(R_3)_a$ are refluxed in toluene as a solvent.

According to a preferred embodiment of the present invention, the conditions of the first reflux reaction include: a reaction temperature of from 10 to 120° C., and a reaction time of from 2 to 12 hours.

According to a preferred embodiment of the present invention, the time for the second reflux reaction is from 2 to 12 hours, and preferably from 4 to 12 hours.

In the preparation of the aminoimine ligand by the above method, after the first reflux reaction, the product does not need to be post-treated, and the diketone can be directly added to perform the second reflux reaction so that the operation is simple.

According to a preferred embodiment of the present invention, the $A(R_3)_a$ encompasses aluminum alkyls, zinc alkyls and lithium alkyls, preferably is selected from aluminum C1-C6 alkyls, zinc C1-C6 alkyls and lithium C1-C6 alkyls, and more preferably is one or more selected from tri-C1-C6-alkyl aluminum, di-C1-C6-alkyl zinc and C1-C6-alkyl lithium, such as trimethyl aluminum, triethyl aluminum, tripropyl aluminum, diethyl zinc and butyl lithium.

In some embodiments of the present invention, the MXn includes nickel halides, such as nickel bromide and nickel chloride, and derivatives of MXn include 1,2-dimethoxyethane nickel halides, such as 1,2-dimethyloxyethane nickel bromide and 1,2-dimethoxyethane nickel chloride.

In a third aspect, the present invention also provides the use of the above-described aminoimine metal complex in olefin polymerization. Preferably, the olefin includes ethylene and α-olefins with a polar group.

In a fourth aspect, the present invention also provides a catalyst for olefin polymerization, the catalyst comprising the above-described aminoimine metal complex.

According to some embodiments of the present invention, the catalyst further comprises a cocatalyst selected from the group consisting of organoaluminum compounds and/or organoboron compounds; the organoaluminum compounds are selected from the group consisting of alkylaluminoxanes or organoaluminum compounds of general formula $AlR_nX^1_{3-n}$ (alkylaluminums or alkyl aluminum halides), in which R is H, a $C_1$-$C_{20}$ hydrocarbyl or a $C_1$-$C_{20}$ hydrocarbyloxy, preferably a $C_1$-$C_{20}$ alkyl, a $C_1$-$C_{20}$ alkoxy, a $C_7$-$C_{20}$ aralkyl or a $C_6$-$C_{20}$ aryl; $X^1$ is a halogen, preferably chlorine or bromine; and $0<n\leq 3$.

According to some embodiments of the present invention, specific examples of the organoaluminum compound include, but are not limited to, trimethylaluminum, triethylaluminum, triisobutylaluminum, tri-n-hexylaluminum, tri-octylaluminum, diethyl aluminum hydride, diisobutyl aluminum hydride, diethyl aluminum chloride, diisobutyl aluminum chloride, ethyl aluminum sesquichloride, ethyl aluminum dichloride, methylaluminoxane (MAO), and modified methyl aluminoxane (MMAO). Preferably, the organoaluminum compound is methylaluminoxane (MAO).

According to some embodiments of the present invention, the organoboron compound is selected from the group consisting of aromatic hydrocarbyl boron compounds and borates. The aromatic hydrocarbyl boron compounds are preferably substituted or unsubstituted phenyl boron, and more preferably tris(pentafluorophenyl)boron. The borates are preferably N,N-dimethylanilinium tetrakis(pentafluorophenyl)borate and/or triphenylcarbonium tetrakis(pentafluorophenyl)borate.

According to some embodiments of the present invention, when the cocatalyst is an organoaluminum compound, a molar ratio of aluminum in the cocatalyst to M in the main catalyst is (10-107):1, for example, 10:1, 20:1, 50:1, 100:1, 200:1, 300:1, 500:1, 700:1, 800:1, 1,000:1, 2,000:1, 3,000:1, 5,000:1, 10,000:1, 100,000:1, 1,000,000:1, 10,000,000:1, and any value therebetween, preferably (10-100,000):1, and more preferably (100-10,000):1; when the cocatalyst is an organoboron compound, a molar ratio of boron in the cocatalyst to M in the main catalyst is (0.1-1,000):1, for example, 0.1:1, 0.2:1, 0.5:1, 1:1, 2:1, 3:1, 5:1, 8:1, 10:1, 20:1, 50:1, 100:1, 200:1, 300:1, 500:1, 700:1, 800:1, 1,000:1, and any value therebetween, preferably (0.1-500):1.

According to some embodiments of the present invention, the olefin polymerized by means of the catalyst of the present invention is a C2-C16 olefin. Preferably, the olefin is ethylene or an α-olefin having 3-16 carbon atoms.

According to some embodiments of the present invention, the catalyst further comprises a chain transfer agent, which is one or more selected from aluminum alkyls, magnesium alkyls, boron alkyls and zinc alkyls, and a molar ratio of the chain transfer agent to M in the main catalyst is (0.1-5,000):1.

In a fifth aspect, the present invention also provides an olefin polymerization process comprising performing an olefin polymerization reaction such as homopolymerization or copolymerization in the presence of the above-described amino-imine metal complex or the above-described catalyst. Preferably, the temperature for the polymerization reaction ranges from −78° C. to 200° C., and preferably from −20° C. to 150° C., and the pressure for the polymerization ranges from 0.01 to 10.0 MPa, and preferably from 0.01 to 2.0 MPa.

According to some embodiments of the present invention, the olefin includes a C2-C16 olefin.

According to some embodiments of the present invention, the olefin includes a C2-C16 α-olefin.

According to some embodiments of the present invention, the olefin includes ethylene.

According to some embodiments of the present invention, the polymerization temperature ranges from −78° C. to 200° C., and preferably from −20° C. to 150° C.

According to some embodiments of the present invention, the polymerization pressure ranges from 0.01 to 10.0 MPa, and preferably from 0.01-2.0 MPa.

According to some embodiments of the present invention, the polymerization is performed by using an olefin monomer in a solvent, and the solvent for polymerization is one or more selected from alkanes, aromatic hydrocarbons and halogenated hydrocarbons.

According to some specific embodiments of the present invention, the solvent for polymerization is one or more selected from hexane, pentane, heptane, benzene, toluene, dichloromethane, chloroform and dichloroethane, and preferably one or more of hexane, toluene and heptane.

In the present disclosure, the symbols used in different general formulae or structural formulae, such as $R^1$, $R^2$, $R^3$, $R^4$, $R^5$, $R^6$, $R^7$, $R^8$, $R^9$, $R^{10}$, $R^{11}$, $R_{12}$, $R_3$, X, M, A, Y, etc. have the same definitions in each general formula or structural formula, unless specifically indicated.

In the present invention, the term "alkyl" refers to straight chain alkyl, branched chain alkyl or cycloalkyl. For example, $C_1$-$C_{20}$ alkyl group refers to a $C_1$-$C_{20}$ straight chain alkyl group, a $C_3$-$C_{20}$ branched chain alkyl group, or a C3-$C_{20}$ cycloalkyl group. Examples include, but are not limited to, methyl, ethyl, n-propyl, isopropyl, n-butyl, sec-butyl, isobutyl, tert-butyl, n-pentyl, isopentyl, tert-pentyl, neopentyl, n-hexyl, n-heptyl, n-octyl, and n-decyl. Examples of $C_3$-$C_{20}$ cycloalkyl include, but are not limited to, cyclopropyl, cyclopentyl, cyclohexyl, 4-methylcyclohexyl, 4-ethylcyclohexyl, 4-n-propylcyclohexyl and 4-n-butylcyclohexyl.

Examples of $C_6$-$C_{20}$ aryl group include, but are not limited to, phenyl, 4-methylphenyl, 4-ethylphenyl, dimethylphenyl, vinylphenyl.

In the present invention, the term "alkenyl" refers to straight chain alkenyl, branched alkenyl or cycloalkenyl. For example, $C_2$-$C_{20}$ alkenyl group refers to a $C_2$-$C_{20}$ straight chain alkenyl group, a $C_3$-$C_{20}$ branched chain alkenyl group, or a C3-$C_{20}$ cycloalkenyl group. Examples include, but are not limited to, vinyl, allyl, butenyl.

Examples of $C_7$-$C_{20}$ aralkyl group include, but are not limited to, phenylmethyl, phenylethyl, phenyl-n-propyl, phenyl-isopropyl, phenyl-n-butyl, and phenyl-t-butyl.

Examples of $C_7$-$C_{20}$ alkaryl group include, but are not limited to, tolyl, ethylphenyl, n-propylphenyl, isopropylphenyl, n-butylphenyl, and tert-butylphenyl.

Compared with the prior art, the present invention has the following advantages:
1. The synthesis method of the complexes of the present invention is simple and easy to implement, whereby the trinuclear complexes can be directly prepared from the ligands.
2. The catalyst of the present invention can catalyze, under the action of the organoaluminum or organoboron cocatalyst, the polymerization of ethylene at a high activity, and especially can maintain high polymerization activity at a higher polymerization temperature (above 90 degrees). (The activity of diimine nickel catalysts reported in the previous literatures or patents is greatly attenuated above 50 degrees, and the molecular weight is greatly reduced).
3. The catalyst of the present invention has better copolymerization performance with α-olefin or polar monomer.

EXAMPLES

The present invention will be described in detail below in conjunction with examples, but the present invention are not limited to these examples.

The analytical characterization instruments and test methods used in the present invention are as follows:

Nuclear magnetic resonance instrument. Bruker DMX 300 (300 MHz), with tetramethyl silicon (TMS) as an internal standard.

Molecular weight and molecular weight distribution PDI (PDI=Mw/Mn) of polymer: measured by PL-GPC220 chromatograph, with trichlorobenzene as a solvent, at 150° C. (standards: PS; flow rate: 1.0 mL/min; Column: 3×PLgel 10 um M1×ED-B 300×7.5 nm).

Activity measurement method: gravimetric method, with activity being expressed as polymer weight (g)/nickel (mol)×2.

The following compounds, ligands and complexes are involved in the following examples:

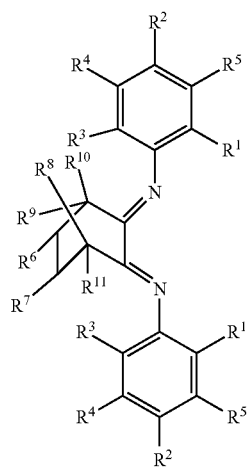

Formula VIIIa

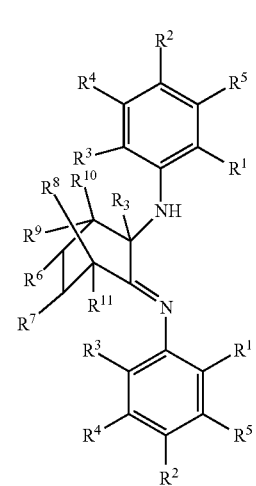

Formula VIa

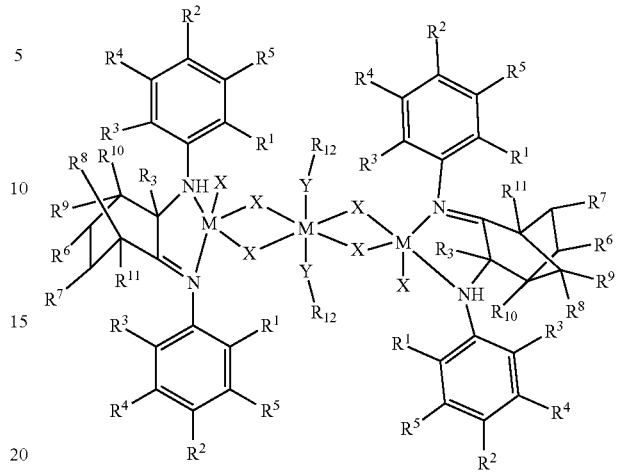

Formula III

Diimine compound A1: α-diimine compound represented by Formula VIIIa, wherein $R^1=R^3$=isopropyl, $R^2=R^4=R^5=R^6=R^7=R^{10}$=H, $R^8=R^9=R^{11}$=CH$_3$;

Diimine compound A2: α-diimine compound represented by Formula VIIIa, wherein $R^1=R^3$=methyl, $R^2=R^4=R^5=R^6=R^7=R^{10}$=H, $R^8=R^9=R^{11}$=CH$_3$;

Ligand L1: amino-imine compound represented by Formula VIa, wherein $R^1=R^3$=isopropyl, $R^2=R^4=R^5=R^6=R^7=R^{10}$=H, $R^8=R^9=R^{11}$=CH$_3$, $R_3$=CH$_3$;

Ligand L2: amino-imine compound represented by Formula VIa, wherein $R^1=R^3$=i-Pr, $R^2=R^4=R^5=R^6=R^7=R^{10}$=H, $R^8=R^9=R^{11}$=CH$_3$, $R_3$=ethyl;

Ligand L3: amino-imine compound represented by Formula VIa, wherein $R^1=R^3$=methyl, $R^2=R^4=R^5=R^6=R^7=R^{10}$=H, $R^8=R^9=R^{11}$=CH$_3$, $R_3$=CH$_3$;

Complex Ni1: the complex represented by Formula III, wherein $R^1=R^3$=isopropyl, $R^2=R^4=R^5=R^6=R^7=R^{10}$=H, $R^8=R^9=R^{11}$=CH$_3$, $R_3$=CH$_3$, $R_{12}$=ethyl, M=Ni, Y=O, X=Br;

Complex Ni2: the complex represented by Formula III, wherein $R^1=R^3$=isopropyl, $R^2=R^4=R^5=R^6=R^7=R^{10}$=H, $R^8=R^9=R^{11}$=CH$_3$, $R_3$=ethyl, $R_{12}$=ethyl, M=Ni, Y=O, X=Br;

Complex Ni3: the complex represented by Formula III, wherein $R^1=R^3$=methyl, $R^2=R^4=R^5=R^6=R^7=R^{10}$=H, $R^8=R^9=R^{11}$=CH$_3$, $R_3$=CH$_3$, $R_{12}$=ethyl, M=Ni, Y=O, X=Br.

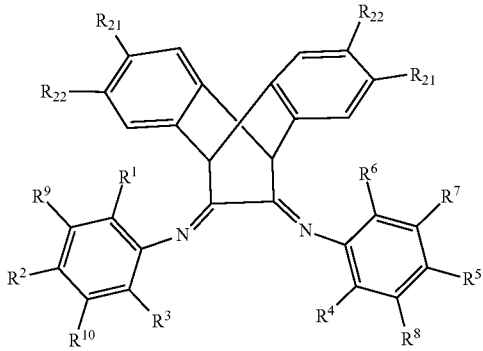

Formula VIII'

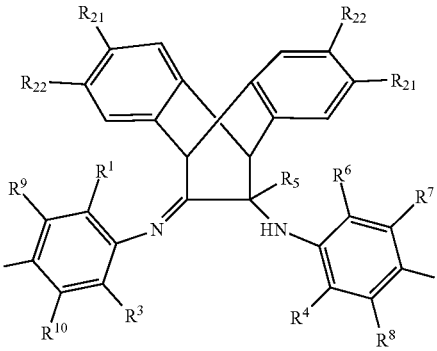

Formula IX

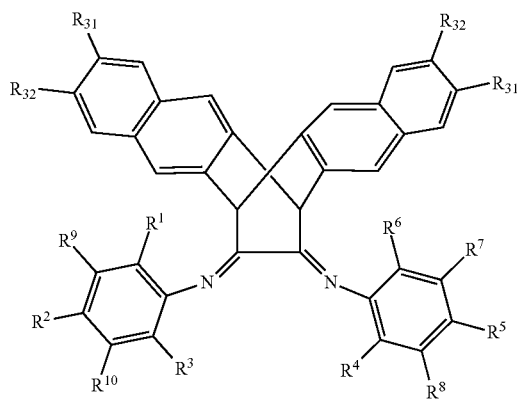

Formula VIII''

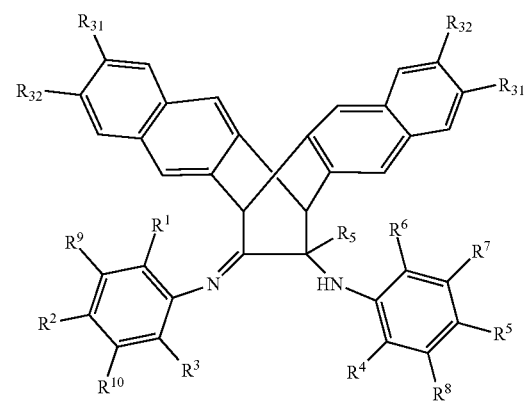

Formula IX'

Diimine compound A3: α-diimine compound represented by Formula VIII', wherein $R^1=R^3=R^4=R^6=CH_3$, $R^2=R^5=R^7=R^8=R^9=R^{10}=R_{21}=R_{22}=H$;

Diimine compound A4: α-diimine compound represented by Formula VIII', wherein $R^1=R^3=R^4=R^6=$i-Pr, $R^2=R^5=R^7=R^8=R^9=R^{10}=R_{21}=R_{22}=H$;

Diimine compound A5: α-diimine compound represented by Formula VIII'', wherein $R^1=R^3=R^4=R^6=$methyl, $R^2=R^5=R^7=R^8=R^9=R^{10}=R_{21}=R_{22}=H$;

Ligand L4: amino-imine compound represented by Formula IX, wherein $R^1=R^3=R^4=R^6=CH_3$, $R^2=R^5=R^7=R^8=R^9=R^1=R_{21}=R_{22}=H$, $R_5=CH_3$;

Ligand L5: amino-imine compound represented by Formula IX, wherein $R^1=R^3=R^4=R^6=$isopropyl, $R^2=R^5=R^7=R^8=R^9=R^{10}=R_{21}=R_{22}=H$, $R_5=CH_3$;

Ligand L6: amino-imine compound represented by Formula IX, wherein $R^1=R^3=R^4=R^6=CH_3$, $R^2=R^5=R^7=R^8=R^9=R^{10}=R_{21}=R_{22}=H$, $R_5=$ethyl;

Ligand L7: amino-imine compound represented by Formula IX', wherein $R^1=R^3=R^4=R^6=$methyl, $R^2=R^5=R^7=R^8=R^9=R^{10}=R_{31}=R_{32}=H$, $R_5=CH_3$;

Formula V

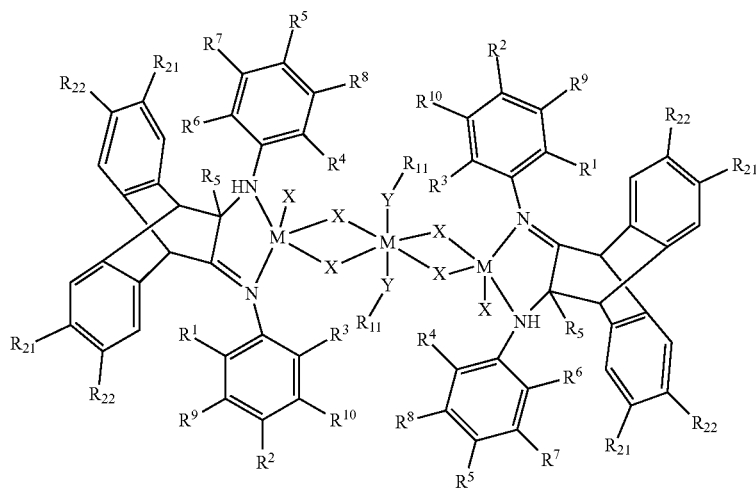

-continued

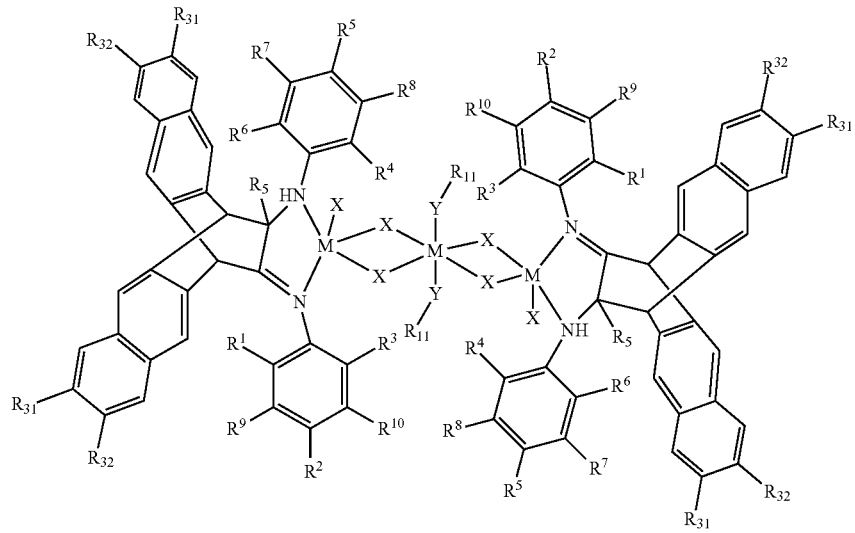

Formula V'

Complex Ni4: the complex represented by Formula V, wherein $R^1=R^3=R^4=R^6=CH_3$, $R^2=R^5=R^7=R^8=R^9=R^{10}=R_{21}=R_{22}=H$, $R_5=CH_3$, $R_{11}$=ethyl, M=Ni, Y=O, X=Br;

Complex Ni5: the complex represented by Formula V, wherein $R^1=R^3=R^4=R^6$=isopropyl, $R^2=R^5=R^7=R^8=R^9=R^{10}=R_{21}=R_{22}=H$; $R_5=CH_3$, $R_{11}$=ethyl, M=Ni, Y=O, X=Br;

Complex Ni6: the complex represented by Formula V, wherein $R^1=R^3=R^4=R^6$=isopropyl, $R^2=R^5=R^7=R^8=R^9=R^{10}=R_{21}=R_{22}=H$; $R_5=CH_3$, $R_{11}$=isobutyl, M=Ni, Y=O, X=Br;

Complex Ni7: the complex represented by Formula V, wherein $R^1=R^3=R^4=R^6=CH_3$, $R^2=R^5=R^7=R^8=R^9=R^{10}=R_{21}=R_{22}=H$; $R_5$=ethyl, $R_{11}$=ethyl, M=Ni, Y=O, X=Br;

Complex Ni8: the complex represented by Formula V', wherein $R^1=R^3=R^4=R^6=CH_3$, $R^2=R^5=R^7=R^8=R^9=R^{10}=R_{31}=R_{32}=H$; $R_5$=methyl, $R_{11}$=ethyl, M=Ni, Y=O, X=Br.

Example 1

1) Preparation of Ligand L1:

To a reaction flask were successively charged with 3.88 g (8 mmol) of α-diimine compound A1, 30 ml of toluene, and 1M trimethylaluminum (16 ml, 16 mmol), and the contents were allowed to react under reflux for 8 hours. The reaction was terminated with sodium hydroxide/ice water and extracted with ethyl acetate, and organic phases were combined and dried over anhydrous magnesium sulfate. The product was separated by column chromatography with petroleum ether/ethyl acetate as an eluent to obtain ligand L1 as colorless crystals in a yield of 84.2%. $^1$HNMR δ(ppm) 7.19-7.06 (m, 6H, Ar—H), 3.42 (s, 1H, NH), 2.98 (m, 2H, CH(CH$_3$)$_2$), 2.88 (m, 2H, CH(CH$_3$)$_2$), 2.32 (m, 1H, CH), 1.81 (m, 4H, CH$_2$), 1.50 (s, 3H, CH$_3$), 1.21 (m, 24H, CH$_3$), 0.92 (s, 3H, CH$_3$), 0.75 (s, 3H, CH$_3$), 0.72 (s, 3H, CH$_3$).

2) Preparation of Complex Ni1:

A solution of (DME)NiBr$_2$ (277 mg, 0.9 mmol) in ethanol (10 mL) was added dropwise to a solution of ligand L1 (300 mg, 0.6 mmol) in dichloromethane (10 mL), and the resulting mixture was stirred at room temperature for 6 h, with precipitants being generated. After filtering, the filter cake was washed with diethyl ether and dried to afford red powdery solids. Yield: 78%. Elemental analysis (calculated for $C_{74}H_{114}Br_6N_4Ni_3O_2$): C, 50.87; H, 6.58; N, 3.21; experimental value (%): C, 50.57; H, 6.73; N, 3.04.

3) 10 atm Ethylene Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.4 mg (2.5 μmol) of the complex Ni1 was added. The reaction was vigorously stirred at 30° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 2

Ethylene polymerization was carried out according to the procedure for ethylene polymerization described in Example 1, except that the polymerization temperature was 60° C. The results are shown in Table 1 below.

Example 3

Ethylene polymerization was carried out according to the procedure for ethylene polymerization described in Example 1, except that the polymerization temperature was 60° C. and the polymerization time was 10 min. The results are shown in Table 1 below.

Example 4

Ethylene polymerization was carried out according to the procedure for ethylene polymerization described in Example 1, except that the polymerization temperature was 60° C. and the polymerization time was 20 min. The results are shown in Table 1 below.

Example 5

Ethylene polymerization was carried out according to the procedure for ethylene polymerization described in Example 1, except that the polymerization temperature was 60° C. and the polymerization time was 60 min. The results are shown in Table 1 below.

Example 6

Ethylene polymerization was carried out according to the procedure for ethylene polymerization described in Example 1, except that the polymerization temperature was 90° C. The results are shown in Table 1 below.

Example 7

10 atm Ethylene Polymerization: After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 0.8 ml of diethyl aluminum chloride (2.0 mol/l solution in toluene) was added, and 4.4 mg (2.5 μmol) of the complex Ni1 was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 8

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, and at the same time 4.4 mg (2.5 μmol) of the complex Ni1, 6 mL of 10-undecen-1-ol, 30 mL of triethylaluminum (1.0 mol/L solution in hexane), 5.0 mL of MAO (1.53 mol/L solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The results are shown in Table 1 below.

Example 9

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, and at the same time 4.4 mg (2.5 μmol) of the complex Ni1, 5.52 g of 10-undecenoic acid, 30 mL of triethylaluminum (1.0 mol/L solution in hexane), 5.0 mL of MAO (1.53 mol/L solution in toluene) were added thereto. The reaction was stirred at 30° C. for 30 minutes, with ethylene pressure being maintained at 10 atm. The reaction mixture was finally neutralized with an ethanol solution acidified with 10 wt % hydrochloric acid to obtain a polymer. The results are shown in Table 1 below.

Example 10

1) Preparation of Ligand L2:

To a reaction flask were successively charged with 3.88 g (8 mmol) of α-diimine compound A1, 30 ml of diethyl ether, and 2M diethylzinc (4 ml, 8 mmol), and the contents were stirred at room temperature for 3 hours. The reaction was terminated with ice water, the reaction mixture was extracted with ethyl acetate, and organic phases were combined and dried over anhydrous magnesium sulfate. The product was separated by column chromatography with petroleum ether/ethyl acetate as an eluent to obtain ligand L2 as colorless crystals in a yield of 52.1%. $^1$HNMR δ(ppm) 7.17-7.06 (m, 6H, Ar—H), 4.44 (s, 1H, NH), 2.98 (m, 2H, $CH(CH_3)_2$), 2.87 (m, 2H, $CH(CH_3)_2$), 2.33 (m, 1H), 1.86 (m, 2H, $CH_2$), 1.81 (m, 4H, $CH_2$), 1.21 (m, 24H, $CH_3$), 1.08 (t, 3H, $CH_3$), 0.93 (s, 3H, $CH_3$), 0.75 (s, 3H, $CH_3$), 0.72 (s, 3H, $CH_3$).

2) Preparation of Complex Ni2:

A solution of $(DME)NiBr_2$ (277 mg, 0.9 mmol) in ethanol (10 mL) was added dropwise to a solution of ligand L2 (309 mg, 0.6 mmol) in dichloromethane (10 mL), and the resulting mixture was stirred at room temperature for 6 h, with precipitants being generated. After filtering, the filter cake was washed with diethyl ether and dried to afford red powdery solids. Yield: 72%. Elemental analysis (calculated for $C_{76}H_{118}Br_6N_4Ni_3O_2$): C, 51.42; H, 6.70; N, 3.16; experimental value (%): C, 51.29; H, 6.98; N, 3.04.

3) 10 atm Ethylene Polymerization:

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 4.4 mg (2.5 μmol) of the complex Ni2 was added. The reaction was vigorously stirred at 30° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 11

Ethylene polymerization was carried out according to the procedure for ethylene polymerization described in Example 10, except that the polymerization temperature was 60° C. The results are shown in Table 1 below.

Example 12

1) Preparation of Ligand L3:

1.5 mL of 2,6-dimethylaniline (12 mmol) was reacted with 57 ml of 1M trimethylaluminum in toluene under refluxing for 3 h. Then, camphorquinone (1.05 g, 5 mmol) was added thereto, and the reaction mixture was refluxed for 8 hours. After cooling, the reaction was terminated with sodium hydroxide/ice water, the reaction mixture was extracted with ethyl acetate, and organic phases were combined and dried over anhydrous magnesium sulfate. The product was separated by column chromatography with petroleum ether/ethyl acetate as an eluent to obtain ligand L3 as colorless crystals in a yield of 70.2%. $^1$HNMR δ(ppm) 7.00-6.89 (m, 6H, Ar—H), 3.57 (s, 1H, NH), 2.18 (s, 6H, $CAr—CH_3$), 2.05 (s, 6H, $CH_3$), 1.74 (m, 4H, $CH_2$), 1.44 (s, 3H, $CH_3$), 1.35 (m, 1H, CH), 1.21 (s, 3H, $CH_3$), 1.01 (s, 3H, $CH_3$), 0.87 (s, 3H, $CH_3$).

2) Preparation of Complex Ni3:

A solution of $(DME)NiBr_2$ (277 mg, 0.9 mmol) in ethanol (10 mL) was added dropwise to a solution of ligand L3 (233 mg, 0.6 mmol) in dichloromethane (10 mL), and the resulting mixture was stirred at room temperature for 6 h, with precipitants being generated. After filtering, the filter cake was washed with diethyl ether and dried to afford red powdery solids. Yield: 70%. Elemental analysis (calculated for $C_{58}H_{82}Br_6N_4Ni_3O_2$): C, 45.75; H, 5.43; N, 3.68; experimental value (%): C, 45.56; H, 5.83; N, 3.46.

3) 10 atm Ethylene Polymerization:

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 3.8 mg (2.5 μmol) of the complex Ni3 was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 13

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 3.8 mg (2.5 μmol) of the complex Ni3 and 10 ml of 1-hexene were added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polymer. The results are shown in Table 1 below.

Comparative Example 1

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 5.5 mg (7.5 μmol) of Comparative Catalyst A was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polymer. The results are shown in Table 1 below.

Comparative Catalyst A

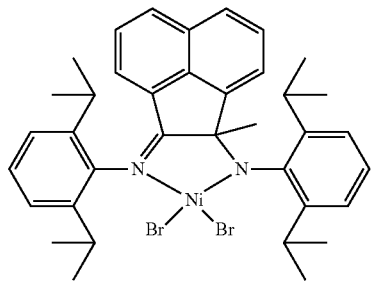

Comparative Example 2

Ethylene polymerization was carried out according to the procedure described in Comparative Example 1, except that 4.8 mg (7.5 μmol) of Comparative Catalyst B was used to replace for the Comparative Catalyst A. The results are shown in Table 1 below.

Comparative Catalyst B

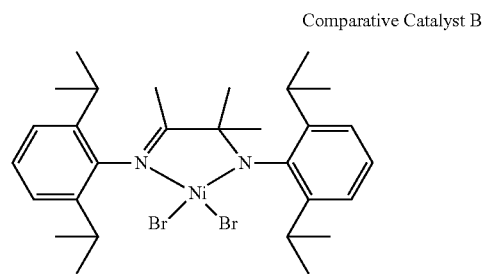

TABLE 1

| Example No. | Complex | Activity ($10^6$ g/mol cat·h) | Mw (×$10^4$) | Mw/Mn |
|---|---|---|---|---|
| Example 1 | Ni1 | 7.62 | 51.0 | 1.02 |
| Example 2 | Ni1 | 8.33 | 38.4 | 1.05 |
| Example 3 | Ni1 | 8.62 | 14.2 | 1.02 |
| Example 4 | Ni1 | 8.42 | 30.4 | 1.03 |
| Example 5 | Ni1 | 7.67 | 62.4 | 1.02 |
| Example 6 | Ni1 | 4.27 | 13.2 | 1.07 |
| Example 7 | Ni1 | 6.24 | 27.2 | 1.23 |
| Example 8 | Ni1 | 4.72 | 37.2 | 1.53 |
| Example 9 | Ni1 | 4.60 | 14.2 | 1.11 |
| Example 10 | Ni2 | 4.08 | 15.4 | 1.03 |
| Example 11 | Ni2 | 4.28 | 8.4 | 1.03 |
| Example 12 | Ni3 | 3.21 | 9.3 | 1.05 |
| Example 13 | Ni3 | 3.54 | 10.1 | 1.04 |
| Comp. Ex. 1 | A | 0.78 | 21.3 | 1.54 |
| Comp. Ex. 2 | B | 0.43 | 18.4 | 1.43 |

It can be seen from Table 1 that the complexes of the present invention can catalyze the polymerization of ethylene with high activity at a higher temperature, with the ethylene polymerization activity of the catalyst of the invention being up to $8.62×10^6$ g·mol$^{-1}$(Ni)·h$^{-1}$. Also, the complexes of the present invention can catalyze the copolymerization of ethylene and higher α-olefin with high activity, and the resulting copolymers have a narrow molecular weight distribution. When used as a main catalyst, the complexes of the invention have much higher polymerization activities under high temperature polymerization conditions, compared with the complexes used in Comparative Examples 1-2, and the obtained polymers have a narrower molecular weight distribution.

Example 14

1) Preparation of Ligand L4:

To a reaction flask were successively charged with 3.52 g (8 mmol) of α-diimine compound A3, 30 ml of toluene, and 1M trimethylaluminum (16 mL, 16 mmol), and the reaction mixture was refluxed for 8 hours. The reaction was terminated with sodium hydroxide/ice water, the reaction mixture was extracted with ethyl acetate, and organic phases were combined and dried over anhydrous magnesium sulfate. The product was separated by column chromatography with petroleum ether/ethyl acetate as an eluent to obtain ligand L4 as colorless crystals in a yield of 85.2%. ¹HNMR δ(ppm) 7.23-6.88 (m, 14H), 4.84 (s, 1H), 4.73 (s, 1H), 3.85 (s, 1H, NH), 2.02 (s, 3H, CH$_3$), 1.87 (s, 6H, CH$_3$), 1.75 (s, 6H, CH$_3$).

2) Preparation of Complex Ni4:

10 mL solution of (DME)NiBr$_2$ (277 mg, 0.9 mmol) in ethanol was added dropwise to 10 mL solution of ligand L4 (274 mg, 0.6 mmol) in dichloromethane, and the resulting mixture was stirred at room temperature for 6 h, with precipitants being generated. After filtering, the filter cake was washed with diethyl ether and dried to afford Ni4 as red powdery solids. Yield: 74%. Elemental analysis (calculated for C$_{70}$H$_{74}$Br$_6$N$_4$Ni$_3$O$_2$): C, 50.68; H, 4.50; N, 3.38; experimental value (%): C, 50.53; H, 4.73; N, 3.21.

3) Ethylene Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.1 mg (2.5 μmol) of the complex Ni4 was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Example 15

Ethylene polymerization was carried out according to the procedure for ethylene polymerization described in Example 14, except that the polymerization temperature was 100° C. The results are shown in Table 2 below.

Example 16

Ethylene polymerization was carried out according to the procedure for ethylene polymerization described in Example 14, except that 0.75 mL of diethyl aluminum monochloride (2.0 mol/L solution in toluene) was used instead of the methylaluminoxane. The results are shown in Table 2 below.

Example 17

1) Preparation of Ligand L5:

To a reaction flask were successively charged with 4.42 g (8 mmol) of α-diimine compound A4, 30 ml of toluene, and 1M trimethylaluminum (16 mL, 16 mmol), and the reaction mixture was refluxed for 8 hours. The reaction was terminated with sodium hydroxide/ice water, the reaction mixture was extracted with ethyl acetate, and organic phases were combined and dried over anhydrous magnesium sulfate. The product was separated by column chromatography with petroleum ether/ethyl acetate as an eluent to obtain ligand L5 as colorless crystals in a yield of 76.2%. ¹HNMR δ(ppm) 7.21-6.95 (m, 14H), 4.96 (s, 1H), 4.87 (s, 1H), 3.85 (s, 1H, NH), 2.51 (m, 4H, CH(CH$_3$)$_2$), 2.02 (s, 3H, CH$_3$), 1.18 (d, 3H, CH$_3$), 1.11 (d, 3H, CH$_3$), 1.05 (d, 6H, CH$_3$), 0.98 (d, 6H, CH$_3$), 0.60 (d, 6H, CH$_3$).

2) Preparation of Complex Ni5:

10 mL solution of (DME)NiBr$_2$ (277 mg, 0.9 mmol) in ethanol was added dropwise to 10 mL solution of ligand L5 (341 mg, 0.6 mmol) in dichloromethane, and the resulting mixture was stirred at room temperature for 6 h, with precipitants being generated. After filtering, the filter cake was washed with diethyl ether and dried to afford Ni5 as red powdery solids. Yield: 76%. Elemental analysis (calculated for C$_{86}$H$_{106}$Br$_6$N$_4$Ni$_3$O$_2$): C, 54.85; H, 5.67; N, 2.97; experimental value (%): C, 54.61; H, 5.73; N, 3.14.

3) Ethylene Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.7 mg (2.5 μmol) of the complex Ni5 was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Example 18

Ethylene polymerization was carried out according to the procedure for ethylene polymerization described in Example 17, except that the polymerization time was 10 min. The results are shown in Table 2 below.

Example 19

Ethylene polymerization was carried out according to the procedure for ethylene polymerization described in Example 17, except that the polymerization time was 20 min. The results are shown in Table 2 below.

Example 20

Ethylene polymerization was carried out according to the procedure for ethylene polymerization described in Example 17, except that the polymerization time was 60 min. The results are shown in Table 2 below.

Example 21

Ethylene polymerization was carried out according to the procedure for ethylene polymerization described in Example 17, except that the polymerization temperature was 100° C. The results are shown in Table 2 below.

Example 22

After having been continuously dried at 130° C. for 6 hrs, a 1 L stainless steel polymerization autoclave equipped with mechanical stirring was evacuated while it was hot and then filled with N$_2$ gas 3 times. 500 mL of hexane and 10 mL of 1-hexene were charged into the polymerization autoclave, then 5.0 mL of methylaluminoxane (MAO) (1.53 mol/l solution in toluene) was added, and 4.7 mg (2.5 μmol) of the complex Ni5 was added. Next, the autoclave was evacuated and then filled with ethylene 3 times. The reaction was then vigorously stirred at 100° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Example 23

After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the polymerization system, and at the same time 6 mL of 10-undecen-1-ol, 30 mL of triethylaluminum (1.0 mol/L solution in hexane), 5.0 mL of methylaluminoxane (MAO) (1.53 mol/l solution in toluene), and 4.7 mg (2.5 μmol) of the complex Ni5 were added thereto. The reaction was stirred at 30° C. for 30 minutes, with ethylene pressure being maintained at 10 atm. The reaction mixture was finally neutralized with an ethanol solution acidified with 5 vol. % hydrochloric acid to obtain a polymer. The results are shown in Table 2 below.

Example 24

Ethylene copolymerization was carried out according to the procedure for ethylene copolymerization described in Example 23, except that the polymerization temperature was 60° C. The results are shown in Table 2 below.

Example 25

After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the polymerization system, and at the same time 5.52 g of 10-undecenoic acid, 30 mL of triethylaluminum (1.0 mol/L solution in hexane), 5.0 mL of methylaluminoxane (MAO) (1.53 mol/l solution in toluene), and 4.7 mg (2.5 μmol) of the complex Ni5 were added thereto. The reaction was stirred at 30° C. for 30 minutes, with ethylene pressure being maintained at 10 atm. The reaction mixture was finally neutralized with an ethanol solution acidified with 5 vol. % hydrochloric acid to obtain a polymer. The results are shown in Table 2 below.

Example 26

Ethylene copolymerization was carried out according to the procedure for ethylene copolymerization described in Example 25, except that the polymerization temperature was 60° C. The results are shown in Table 2 below.

Example 27

Preparation of Complex Ni6:
A solution of 277 mg (0.9 mmol) of (DME)NiBr₂ in 2-methyl-1-propanol (10 mL) was added slowly dropwise to a solution of 341 mg (0.6 mmol) of ligand L5 in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni6 as brownish-red powdery solids. Yield: 84.0%. Elemental analysis (calculated for $C_{90}H_{14}Br_6N_4Ni_3O_2$): C, 55.74; H, 5.92; N, 2.89; experimental value (%): C, 56.08; H, 6.12; N, 3.08.
3) Ethylene Polymerization:
After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the polymerization autoclave, then 5.0 mL of methylaluminoxane (MAO) (1.53 mol/l solution in toluene) was added, and 4.8 mg (2.5 μmol) of the complex Ni6 was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Example 28

1) Preparation of Ligand L6:
To a reaction flask were successively charged with 3.52 g (8 mmol) of α-diimine compound A3, 30 ml of diethyl ether, and 2M diethylzinc (4 mL, 8 mmol), and the reaction mixture was stirred at room temperature for 3 hours. The reaction was terminated with ice water, the reaction mixture was extracted with ethyl acetate, and organic phases were combined and dried over anhydrous magnesium sulfate. The product was separated by column chromatography with petroleum ether/ethyl acetate as an eluent to obtain ligand L3 as colorless crystals in a yield of 50.1%. ¹HNMR δ(ppm) 7.22-6.86 (m, 14H), 4.82 (s, 1H), 4.73 (s, 1H), 3.85 (s, 1H, NH), 2.04 (m, 2H, CH₂CH₃), 1.89 (s, 6H, CH₃), 1.74 (s, 6H, CH₃), 0.89 (t, 3H, CH₃).
2) Preparation of Complex Ni7:
10 mL solution of (DME)NiBr₂ (277 mg, 0.9 mmol) in ethanol was added dropwise to 10 mL solution of ligand L6 (282 mg, 0.6 mmol) in dichloromethane, and the resulting mixture was stirred at room temperature for 6 h, with precipitants being generated. After filtering, the filter cake was washed with diethyl ether and dried to afford Ni7 as red powdery solids. Yield: 73%. Elemental analysis (calculated for $C_{72}H_{78}Br_6N_4Ni_3O_2$): C, 51.26; H, 4.66; N, 3.32; experimental value (%): C, 51.39; H, 4.93; N, 3.24.
3) Ethylene Polymerization:
After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the polymerization autoclave, then 5.0 mL of methylaluminoxane (MAO) (1.53 mol/l solution in toluene) was added, and 4.2 mg (2.5 μmol) of the complex Ni7 was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Example 29

Ethylene polymerization was carried out according to the procedure for ethylene polymerization described in Example 28, except that the polymerization temperature was 100° C. The results are shown in Table 2 below.

Example 30

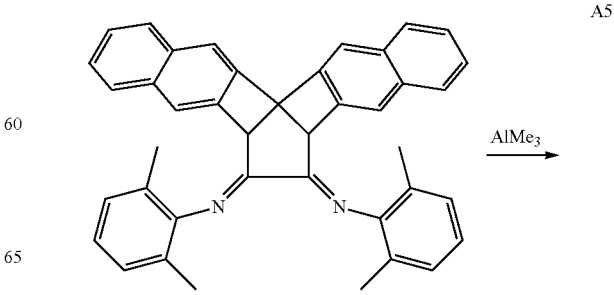

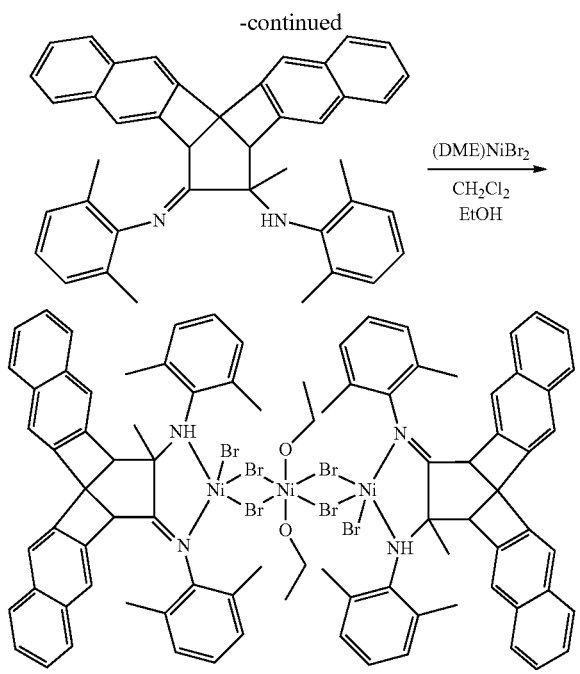

1) Preparation of Ligand L7:

To a reaction flask were successively charged with 4.32 g (8 mmol) of α-diimine compound A5, 30 ml of toluene, and 1M trimethylaluminum (16 mL, 16 mmol), and the reaction mixture was stirred at room temperature for 3 hours. The reaction was terminated with ice water, the reaction mixture was extracted with ethyl acetate, and organic phases were combined and dried over anhydrous magnesium sulfate. The product was separated by column chromatography with petroleum ether/ethyl acetate as an eluent to obtain ligand L7 as colorless crystals in a yield of 72.1%. $^1$HNMR δ(ppm) 7.68-7.54 (m, 8H), 7.37 (m, 4H), 7.11-7.04 (m, 6H), 5.16 (s, 1H), 5.08 (s, 1H), 4.05 (s, 1H, NH), 1.94 (s, 3H, CH$_3$), 1.89 (s, 6H, CH$_3$), 1.73 (s, 6H, CH$_3$).

2) Preparation of Complex Ni8:

10 mL solution of (DME)NiBr$_2$ (277 mg, 0.9 mmol) in ethanol was added dropwise to 10 mL solution of ligand L7 (334 mg, 0.6 mmol) in dichloromethane, and the resulting mixture was stirred at room temperature for 6 h, with precipitants being generated. After filtering, the filter cake was washed with diethyl ether and dried to afford red powdery solids. Yield: 72%. Elemental analysis (calculated for C$_{86}$H$_{82}$Br$_6$N$_4$Ni$_3$O$_2$): C, 55.56; H, 4.45; N, 3.01; experimental value (%): C, 55.74; H, 4.73; N, 3.14.

3) Ethylene Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methyl-aluminoxane (MAO) (1.53 mol/l solution in toluene) was added, and 4.6 mg (2.5 μmol) of the complex Ni8 was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Example 31

Ethylene polymerization was carried out according to the procedure for ethylene polymerization described in Example 30, except that the polymerization temperature was 100° C. The results are shown in Table 2 below.

Example 32

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methyl-aluminoxane (MAO) (1.53 mol/l solution in toluene) and 10 mL of 1-hexene were added, and 4.6 mg (2.5 μmol) of the complex Ni8 was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polymer. The results are shown in Table 2 below.

Comparative Example 3

Comparative Catalyst C was prepared by following patent application CN102250152A.

Ethylene Polymerization: After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 5.5 mg (7.5 μmol) of Comparative Catalyst C was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Comparative Catalyst C

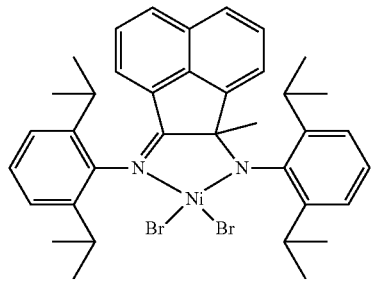

Comparative Example 4

Comparative Catalyst D was prepared by following patent application CN102250152A.

Ethylene Polymerization: Ethylene polymerization was carried out according to the procedure for ethylene polymerization described in Comparative Example 3, except that 4.8 mg (7.5 μmol) of Comparative Catalyst D was used instead of Comparative Catalyst C. The results are shown in Table 2 below.

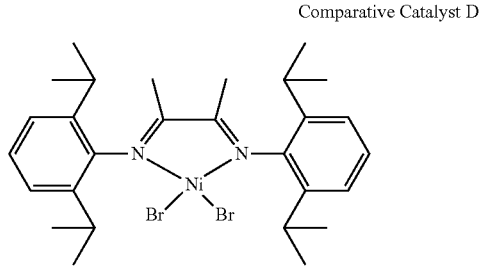

Comparative Catalyst D

TABLE 2

| Example | Complex | Activity ($10^5$ g/mol cat·h) | Mw ($\times 10^{-4}$) | Mw/Mn |
|---|---|---|---|---|
| Example 14 | Ni4 | 4.32 | 2.27 | 1.05 |
| Example 15 | Ni4 | 3.09 | 0.96 | 1.68 |
| Example 16 | Ni4 | 3.94 | 1.80 | 1.10 |
| Example 17 | Ni5 | 8.12 | 50.6 | 1.05 |
| Example 18 | Ni5 | 8.11 | 17.3 | 1.03 |
| Example 19 | Ni5 | 8.14 | 36.1 | 1.02 |
| Example 20 | Ni5 | 8.00 | 70.2 | 1.08 |
| Example 21 | Ni5 | 6.44 | 20.1 | 1.63 |
| Example 22 | Ni5 | 6.82 | 21.3 | 1.62 |
| Example 23 | Ni5 | 5.27 | 50.2 | 1.26 |
| Example 24 | Ni5 | 4.86 | 21.7 | 1.32 |
| Example 25 | Ni5 | 4.72 | 17.3 | 1.03 |
| Example 26 | Ni5 | 4.08 | 10.2 | 1.16 |
| Example 27 | Ni6 | 5.33 | 18.3 | 172 |
| Example 28 | Ni7 | 2.17 | 1.42 | 1.06 |
| Example 29 | Ni7 | 1.04 | 0.67 | 1.69 |
| Example 30 | Ni8 | 4.82 | 2.52 | 1.07 |
| Example 31 | Ni8 | 3.67 | 1.76 | 1.80 |
| Example 32 | Ni8 | 3.88 | 1.82 | 1.72 |
| Comp. Ex. 3 | C | Trace amount | | |
| Comp. Ex. 4 | D | Trace amount | | |

It can be seen from Table 2 that when used as a main catalyst, the amino-imine metal complexes of the present invention have higher polymerization activities under high temperature polymerization conditions, compared with the catalysts used in Comparative Examples 3 and 4, and the obtained polymers have a higher molecular weight and a narrower molecular weight distribution than that of the polymers obtained in the comparative examples.

It should be noted that the above-described examples are used only to illustrate the present invention and do not constitute any limitation to the present invention. The present invention has been described with reference to typical examples, but it should be understood that the words used therein are descriptive and explanatory words, rather than restrictive words. The present invention may be modified within the scope of the claims of the present invention as stipulated, and the present invention may be revised without departing from the scope and spirit of the present invention. Although the present invention described therein relates to specific methods, materials and embodiments, it does not mean that the present invention is limited to the specific examples disclosed therein. On the contrary, the present invention can be extended to all other methods and applications with the same function.

We claim:

1. An amino-imine metal complex represented by Formula I:

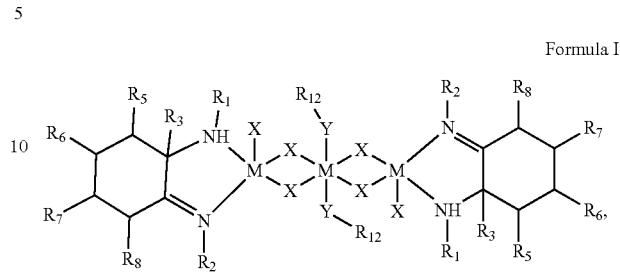

Formula I wherein, $R_1$ and $R_2$ are each independently a C1-C30 hydrocarbyl with or without a substituent Q; each $R_3$ is independently selected from the group consisting of hydrogen and C1-C20 hydrocarbyl with or without a substituent Q;

$R_5$-$R_8$ are each independently selected from the group consisting of hydrogen, halogen, hydroxy, C1-C20 hydrocarbyl with or without a substituent Q, and $R_5$-$R_8$ groups are optionally joined to form a ring or ring system;

each $R_{12}$ is independently a C1-C20 hydrocarbyl with or without a substituent Q;

each Y is independently a Group VIA non-metal atom;

each M is independently a Group VIII metal; and each X is independently selected from the group consisting of halogen, C1-C10 hydrocarbyl with or without a substituent Q and C1-C10 hydrocarbyloxy with or without a substituent Q, with the substituent Q being selected from the group consisting of halogen, hydroxy, C1-C10 alkyl, halogenated C1-C10 alkyl, C1-C10 alkoxy and halogenated C1-C10 alkoxy.

2. The amino-imine metal complex as claimed in claim 1, having at least one of the following features:

$R_1$ and $R_2$ are independently selected from the group consisting of C1-C20 alkyl with or without a substituent Q and C6-C20 aryl with or without a substituent Q;

each M is independently selected from the group consisting of nickel and palladium;

each Y is independently selected from the group consisting of O and S;

each X is independently selected from the group consisting of halogen, C1-C10 alkyl with or without a substituent Q and C1-C10 alkoxy with or without a substituent Q;

each $R_{12}$ is independently a C1-C20 alkyl with or without a substituent Q;

each $R_3$ is selected from the group consisting of C1-C20 alkyl with or without a substituent Q, C6-C20 aryl with or without a substituent Q, C7-C20 aralkyl with or without a substituent Q and C7-C20 alkaryl with or without a substituent Q; and the substituent Q is selected from the group consisting of halogen, hydroxy, C1-C6 alkyl, halogenated C1-C6 alkyl, C1-C6 alkoxy and halogenated C1-C6 alkoxy.

3. The amino-imine metal complex as claimed in claim 1, which is represented by Formula III:

Formula III

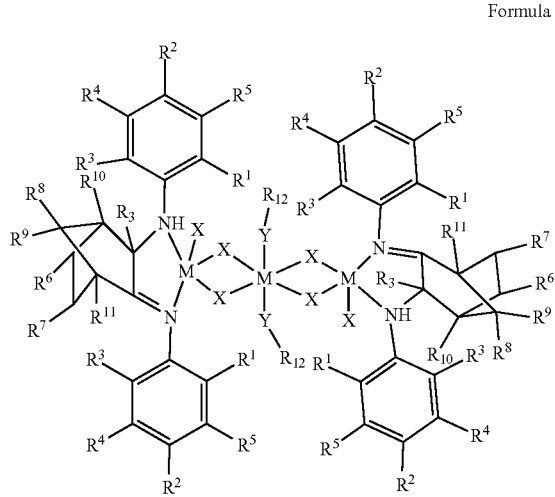

wherein,
$R^1$-$R^{11}$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkyloxy with or without a substituent Q, C7-C20 alkaryl with or without a substituent Q and C7-C20 alkaryloxy with or without a substituent Q; and
$R_3$, $R_{12}$, Y, M and X are as defined in claim 1.

4. The amino-imine metal complex as claimed in claim 3, wherein $R^1$-$R^{11}$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q.

5. The amino-imine metal complex as claimed in claim 3, which is selected from the group consisting of:
the complex represented by Formula III, wherein $R^1=R^3$=isopropyl, $R^2=R^4=R^5=R^6=R^7=R^{10}$=H, $R^8=R^9=R^{11}$=CH$_3$, $R_3$=CH$_3$, $R_{12}$=methyl, M=Ni, Y=O, X=Br;
the complex represented by Formula III, wherein $R^1=R^3$=isopropyl, $R^2=R^4=R^5=R^6=R^7=R^{10}$=H, $R^8=R^9=R^{11}$=CH$_3$, $R_3$=ethyl, $R_{12}$=methyl, M=Ni, Y=O, X=Br;
the complex represented by Formula III, wherein $R^1=R^3$=ethyl, $R^2=R^4=R^5=R^6=R^7=R^{10}$=H, $R^8=R^9=R^{11}$=CH$_3$, $R_3$=CH$_3$, $R_{12}$=methyl, M=Ni, Y=O, X=Br;
the complex represented by Formula III, wherein $R^1=R^3$=ethyl, $R^2=R^4=R^5=R^6=R^7=R^{10}$=H, $R^8=R^9=R^{11}$=CH$_3$, $R_3$=ethyl, $R_{12}$=methyl, M=Ni, Y=O, X=Br;
the complex represented by Formula III, wherein $R^1=R^3$=methyl, $R^2=R^4=R^5=R^6=R^7=R^{10}$=H, $R^8=R^9=R^{11}$=CH$_3$, $R_3$=CH$_3$, $R_{12}$=methyl, M=Ni, Y=O, X=Br;
the complex represented by Formula III, wherein $R^1=R^3$=methyl, $R^2=R^4=R^5=R^6=R^7=R^{10}$=H, $R^8=R^9=R^{11}$=CH$_3$, $R_3$=ethyl, $R_{12}$=methyl, M=Ni, Y=O, X=Br;
the complex represented by Formula III, wherein $R^1=R^3$=isopropyl, $R^2=R^4=R^5=R^6=R^7=R^{10}$=H, $R^8=R^9=R^{11}$=CH$_3$, $R_3$=CH$_3$, $R_{12}$=ethyl, M=Ni, Y=O, X=Br;
the complex represented by Formula III, wherein $R^1=R^3$=isopropyl, $R^2=R^4=R^5=R^6=R^7=R^{10}$=H, $R^8=R^9=R^{11}$=CH$_3$, $R_3$=ethyl, $R_{12}$=ethyl, M=Ni, Y=O, X=Br;
the complex represented by Formula III, wherein $R^1=R^3$=ethyl, $R^2=R^4=R^5=R^6=R^7=R^{10}$=H, $R^8=R^9=R^{11}$=CH$_3$, $R_3$=CH$_3$, $R_{12}$=ethyl, M=Ni, Y=O, X=Br;
the complex represented by Formula III, wherein $R^1=R^3$=ethyl, $R^2=R^4=R^5=R^6=R^7=R^{10}$=H, $R^8=R^9=R^{11}$=CH$_3$, $R_3$=ethyl, $R_{12}$=ethyl, M=Ni, Y=O, X=Br;
the complex represented by Formula III, wherein $R^1=R^3$=methyl, $R^2=R^4=R^5=R^6=R^7=R^{10}$=H, $R^8=R^9=R^{11}$=CH$_3$, $R_3$=CH$_3$, $R_{12}$=ethyl, M=Ni, Y=O, X=Br;
the complex represented by Formula III, wherein $R^1=R^3$=methyl, $R^2=R^4=R^5=R^6=R^7=R^{10}$=H, $R^8=R^9=R^{11}$=CH$_3$, $R_3$=ethyl, $R_{12}$=ethyl, M=Ni, Y=O, X=Br;
the complex represented by Formula III, wherein $R^1=R^3$=methyl, $R^2=R^4=R^5=R^6=R^7=R^{10}$=H, $R^8=R^9=R^{11}$=CH$_3$, $R_3$=CH$_3$, $R_{12}$=i-Pr, M=Ni, Y=O, X=Br;
the complex represented by Formula III, wherein $R^1$-$R^3$=methyl, $R^4$-$R^7=R^{10}$=H, $R^8=R^9=R^{11}$=CH$_3$, $R_3$=ethyl, $R_{12}$=ethyl, M=Ni, Y=O, X=Br;
the complex represented by Formula III, wherein $R^1$-$R^3$=methyl, $R^4$-$R^7=R^{10}$=H, $R^8=R^9=R^{11}$=CH$_3$, $R_3$=CH$_3$, $R_{12}$=ethyl, M=Ni, Y=O, X=Br;
the complex represented by Formula III, wherein $R^1=R^3$=methyl, $R^2$=Br, $R^4$-$R^7=R^{10}$=H, $R^8=R^9=R^{11}=R_3$=CH$_3$, $R_{12}$=ethyl, M=Ni, Y=O, X=Br;
the complex represented by Formula III, wherein $R^1=R^3$=methyl, $R^2$=Br, $R^4$-$R^7=R^{10}$=H, $R^8=R^9=R^{11}$=CH$_3$, $R_3$=ethyl, $R_{12}$=ethyl, M=Ni, Y=O, X=Br;
the complex represented by Formula III, wherein $R^1=R^3$=F, $R^2=R^4$-$R^7=R^{10}$=H, $R^8=R^9=R^{11}$=CH$_3$, $R_3$=ethyl, $R_{12}$=ethyl, M=Ni, Y=O, X=Br;
the complex represented by Formula III, wherein $R^1=R^3$=Cl, $R^2=R^4$-$R^7=R^{10}$=H, $R^8=R^9=R^{11}$=CH$_3$, $R_3$=ethyl, $R_{12}$=ethyl, M=Ni, Y=O, X=Br;
the complex represented by Formula III, wherein $R^1=R^3$=Br, $R^2=R^4$-$R^7=R^{10}$=H, $R^8=R^9=R^{11}$=CH$_3$, $R_3$=ethyl, $R_{12}$=ethyl, M=Ni, Y=O, X=Br;

the complex represented by Formula III, wherein $R^1=R^3$=methyl, $R^2=R^4\text{-}R^7=R^{10}$=H, $R^8=R^9=R^{11}$=CH$_3$, $R_3$=ethyl, $R^{12}$=isobutyl, M=Ni, Y=O, X=Br;

the complex represented by Formula III, wherein $R^1=R^3$=ethyl, $R^2=R^4\text{-}R^7=R^{10}$=H, $R^8=R^9=R^{11}$=CH$_3$, $R_3$=CH$_3$, $R_{12}$=isobutyl, M=Ni, Y=O, X=Br;

the complex represented by Formula III, wherein $R^1=R^3$=isopropyl, $R^2=R^4\text{-}R^7=R^{10}$=H, $R^8=R^9=R^{11}$=CH$_3$, $R_3$=CH$_3$, $R_{12}$=isobutyl, M=Ni, Y=O, X=Br;

the complex represented by Formula III, wherein $R^1\text{-}R^3$=methyl, $R^4\text{-}R^7=R^{10}$=H, $R^8=R^9=R^{11}$=CH$_3$, $R_3$=CH$_3$, $R_{12}$=isobutyl, M=Ni, Y=O, X=Br;

the complex represented by Formula III, wherein $R^1=R^3$=methyl, $R^2$=Br, $R^4\text{-}R^7=R^{10}$=H, $R^8=R^9=R^{11}$=methyl, $R^3$=isopropyl, $R^{12}$=isobutyl, M=Ni, Y=O, X=Br;

the complex represented by Formula III, wherein $R^1=R^3$=F, $R^2=R^4\text{-}R^7=R^{10}$=H, $R^8=R^9=R^{11}$=CH$_3$, $R^3$=isopropyl, $R^{12}$=isobutyl, M=Ni, Y=O, X=Br;

the complex represented by Formula III, wherein $R^1=R^3$=Cl, $R^2=R^4\text{-}R^7=R^{10}$=H, $R^8=R^9=R^{11}$=CH$_3$, $R^3$=isopropyl, $R^{12}$=isobutyl, M=Ni, Y=O, X=Br;

the complex represented by Formula III, wherein $R^1=R^3$=Br, $R^2=R^4\text{-}R^7=R^{10}$=H, $R^8=R^9=R^{11}$=CH$_3$, $R^3$=isopropyl, $R^{12}$=isobutyl, M=Ni, Y=O, X=Br;

the complex represented by Formula III, wherein $R^1=R^3$=methyl, $R^2=R^4\text{-}R^7=R^{10}$=H, $R^8=R^9$=CH$_3$, $R^{11}$=bromomethyl, $R^3$=isopropyl, $R^{12}$=ethyl, M=Ni, Y=O, X=Br;

the complex represented by Formula III, wherein $R^1=R^3$=ethyl, $R^2=R^4\text{-}R^7=R^{10}$=H, $R^8=R^9$=CH$_3$, $R^{11}$=CH$_2$Br, $R^3$=isopropyl, $R^{12}$=ethyl, M=Ni, Y=O, X=Br;

the complex represented by Formula III, wherein $R^1=R^3$=isopropyl, $R^2=R^4\text{-}R^7=R^{10}$=H, $R^8=R^9$=CH$_3$, $R^{11}$=CH$_2$Br, $R^3$=ethyl, $R^{12}$=ethyl, M=Ni, Y=O, X=Br;

the complex represented by Formula III, wherein $R^1\text{-}R^3$=methyl, $R^4\text{-}R^7=R^{10}$=H, $R^8=R^9$=CH$_3$, $R^{11}$=CH$_2$Br, $R^{12}$=ethyl, M=Ni, Y=O, X=Br;

the complex represented by Formula III, wherein $R^1=R^3$=methyl, $R^2$=Br, $R^4\text{-}R^7=R^{10}$=H, $R^8=R^9$=methyl, $R_3$=ethyl, $R^{11}$=CH$_2$Br, $R_{12}$=ethyl, M=Ni, Y=O, X=Br;

the complex represented by Formula III, wherein $R^1=R^3$=F, $R^2=R^4\text{-}R^7=R^{10}$=H, $R^8=R^9$=methyl, $R^{11}$=CH$_2$Br, $R^3$=isobutyl, $R^{12}$=ethyl, M=Ni, Y=O, X=Br;

the complex represented by Formula III, wherein $R^1=R^3$=Cl, $R^2=R^4\text{-}R^7=R^{10}$=H, $R^8=R^9$=methyl, $R^{11}$=CH$_2$Br, $R^3$=isobutyl, $R^{12}$=ethyl, M=Ni, Y=O, X=Br; and the complex represented by Formula III, wherein $R^1=R^3$=Br, $R^2=R^4\text{-}R^7=R^{10}$=H, $R^8=R^9$=methyl, $R^{11}$=CH$_2$Br, $R_3$=isobutyl, $R_{12}$=ethyl, M=Ni, Y=O, X=Br.

6. The amino-imine metal complex as claimed in claim 1, which has a structure represented by Formula IV:

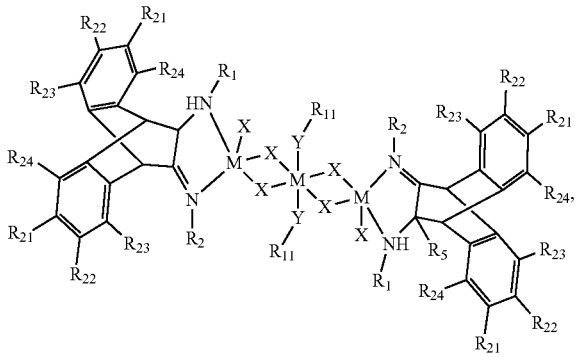

Formula IV wherein, $R_1$ and $R_2$ are each independently a C1-C30 hydrocarbyl with or without a substituent Q;

$R_{21}$-$R_{24}$ are each independently selected from the group consisting of hydrogen, halogen, hydroxy, C1-C20 hydrocarbyl with or without a substituent Q and C1-C20 hydrocarbyloxy with or without a substituent Q, and $R_{21}$-$R_{24}$ are optionally joined to form a ring or ring system;

each $R_5$ is independently selected from the group consisting of hydrogen and C1-C20 hydrocarbyl with or without a substituent Q;

each $R_{11}$ is independently a C1-C20 hydrocarbyl with or without a substituent Q;

each Y is independently a Group VIA nonmetal atom;

each M is independently a Group VIII metal; and each X is independently selected from the group consisting of halogen, C1-C10 hydrocarbyl with or without a substituent Q and C1-C10 hydrocarbyloxy with or without a substituent Q.

7. The amino-imine metal complex as claimed in claim 6, having at least one of the following features:

$R_1$ and $R_2$ are independently selected from the group consisting of C1-C20 alkyl with or without a substituent Q and C6-C20 aryl with or without a substituent Q;

each M is independently selected from the group consisting of nickel and palladium;

each Y is independently selected from the group consisting of O and S;

each X is independently selected from the group consisting of halogen, C1-C10 alkyl with or without a substituent Q and C1-C10 alkoxy with or without a substituent Q;

each $R_{11}$ is independently a C1-C20 alkyl with or without a substituent Q;

each $R_5$ is independently selected from the group consisting of C1-C20 alkyl with or without a substituent Q, C6-C20 aryl with or without a substituent Q, C7-C20 aralkyl with or without a substituent Q and C7-C20 alkaryl with or without a substituent Q;

the substituent Q is selected from the group consisting of halogen, hydroxy, C1-C6 alkyl, halogenated C1-C6 alkyl, C1-C6 alkoxy and halogenated C1-C6 alkoxy; and $R_{21}$-$R_{24}$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C7-C20 aralkyl with or without a substituent Q, C7-C20 alkaryl with or without a substituent Q, C6-C20 aryloxy with or without a substituent Q, C7-C20 aralkyloxy with or without a substituent Q and C7-C20 alkaryloxy with or without a substituent Q, and $R_{21}$-$R_{24}$ are optionally joined to form a ring or ring system.

8. The amino-imine metal complex as claimed in claim 6, which has a structure represented by Formula IVa:

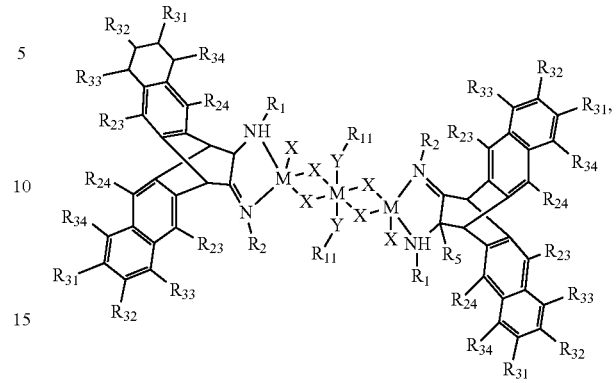

Formula IVa wherein $R_{31}$-$R_{34}$ have the same meanings as $R_{21}$-$R_{24}$ in Formula IV, and $R_1$, $R_2$, $R_5$, $R_{11}$, Y, M and X are as defined for Formula IV in claim 6.

9. The amino-imine metal complex as claimed in claim 6, which is represented by the following Formula V or V':

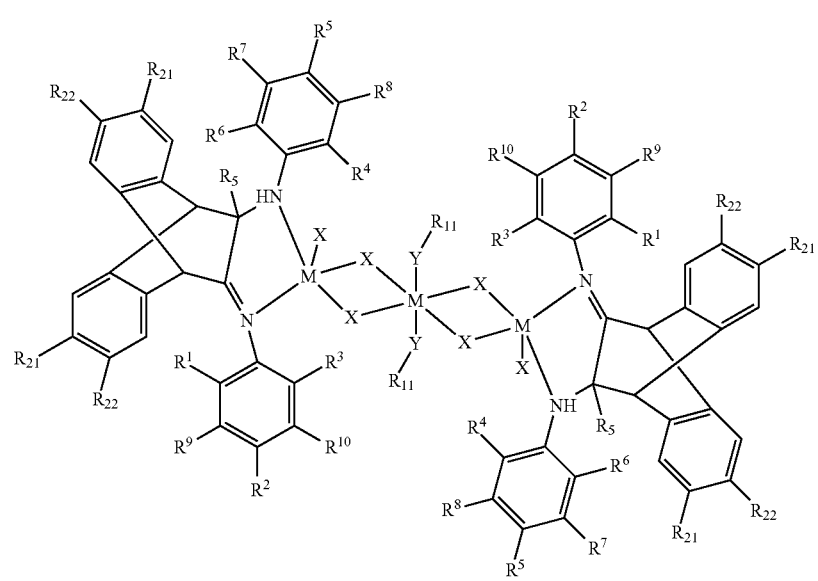

Formula V

-continued

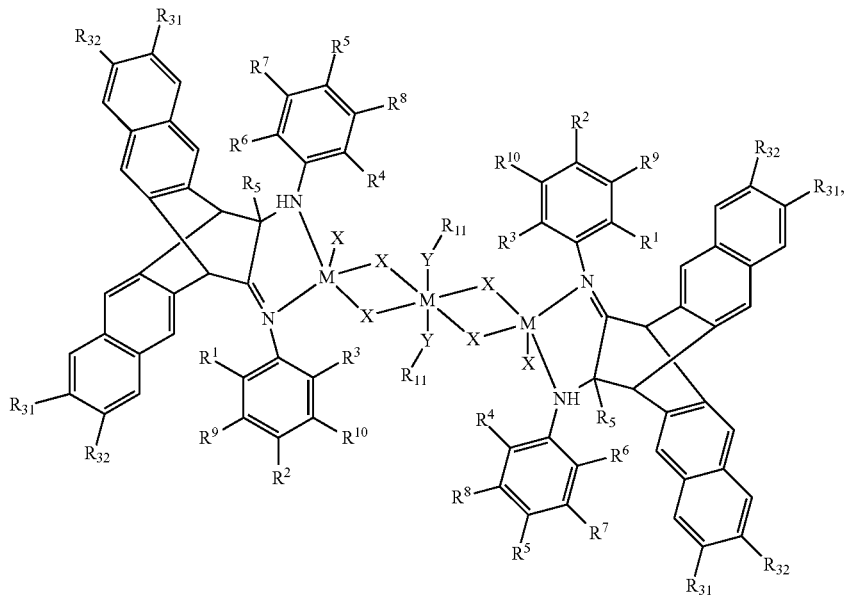

Formula V' wherein the individual symbols are as defined above.

10. A method for preparing the amino-imine metal complex according to claim 1, comprising step 1) reacting an amino-imine compound represented by Formula VI with $MX_n$ and $R_{12}YH$ to generate the amino-imine metal complex represented by Formula I,

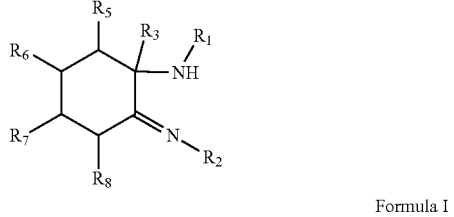

Formula VI

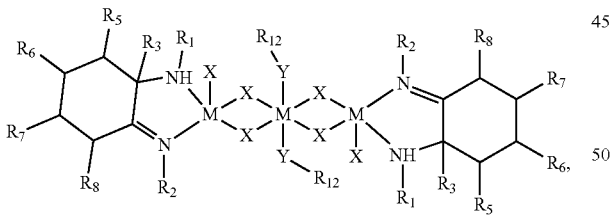

Formula I wherein, $R_1$, $R_2$, $R_3$, and $R_5$-$R_8$ in Formula VI have the meanings as defined for Formula I in claim 1;

M and X in the $MX_n$ have the meanings as defined for Formula I in claim 1, and n is the number of X satisfying the valence state of M;

and Y and $R_{12}$ in the $R_{12}YH$ have the meanings as defined for Formula I in claim 1.

11. The method as claimed in claim 10, wherein a preparation of the amino-imine compound represented by Formula VI comprises step 2) reacting a diketone compound represented by Formula VII with $A(R_3)_a$ and an amine compound, to generate the amino-imine compound represented by Formula VI, with the amine compound being $R_1NH_2$ and $R_2NH_2$;

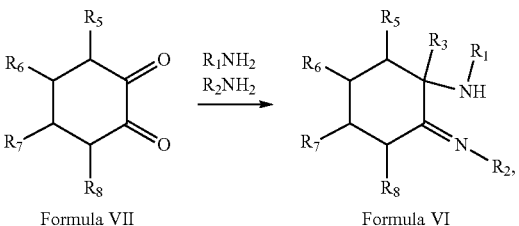

Formula VII → Formula VI wherein, A is one or more of aluminum, zinc, lithium and magnesium, and a molar ratio of the $A(R_3)_a$ to the amine compound is greater than or equal to 2.0.

12. The method as claimed in claim 11, wherein the reaction in step 1) is carried out in an organic solvent; and the reaction in step 2) is carried out in an aprotic solvent.

13. The method as claimed in claim 10, wherein a preparation of the amino-imine compound represented by Formula VI comprises contacting and reacting a diimine compound represented by Formula VIII with $A(R_3)_a$ or a Grignard reagent to generate the amino-imine compound represented by Formula VI,

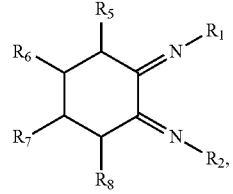

Formula VIII wherein $R_1$, $R_2$, and $R_5$-$R_8$ have the same definitions as in Formula I;

in the $A(R_3)_a$, A is one or more of aluminum, zinc, lithium and magnesium, $R_3$ has the same definitions as in Formula I, and a is the number of $R_3$ that satisfies the valence state of A;

and the Grignard reagent has a general formula of R₃MgX, wherein R₃ has the same definitions as in Formula I, X is a halogen.

14. A catalyst for olefin polymerization, comprising the amino-imine metal complex as claimed in claim 1, and one or both of a cocatalyst and a chain transfer agent.

15. An olefin polymerization process, comprising carrying out an olefin polymerization reaction in the presence of the catalyst according to claim 14, the temperature for the polymerization reaction is from −78° C. to 200° C., and the polymerization pressure is from 0.01 to 10.0 MPa.

16. The amino-imine metal complex as claimed in claim 1, having at least one of the following features:

R₁ and R₂ are independently selected from the group consisting of C1-C20 alkyl with or without a substituent Q and C6-C20 aryl with or without a substituent Q, with a proviso that at least one of R₁ and R₂ is a group represented by Formula A:

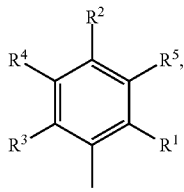

Formula A wherein, R¹-R⁵ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkyloxy with or without a substituent Q, C7-C20 alkaryl with or without a substituent Q and C7-C20 alkaryloxy with or without a substituent Q, and R¹-R⁵ are optionally joined to form a ring or ring system;

each X is independently selected from the group consisting of halogen, C1-C6 alkyl with or without a substituent Q and C1-C6 alkoxy with or without a substituent Q;

each R₁₂ is independently a C1-C10 alkyl with or without a substituent Q;

each R₃ is selected from the group consisting of C1-C10 alkyl with or without a substituent Q, C6-C10 aryl with or without a substituent Q, C7-C15 aralkyl with or without a substituent Q and C7-C15 alkaryl with or without a substituent Q; and the substituent Q is selected from the group consisting of halogen, hydroxy, C1-C6 alkyl, halogenated C1-C6 alkyl, C1-C6 alkoxy and halogenated C1-C6 alkoxy, with the C1-C6 alkyl being selected from methyl, ethyl, n-propyl, isopropyl, n-butyl, isobutyl, n-pentyl, isopentyl, n-hexyl, isohexyl and 3,3-dimethylbutyl, and with the C1-C6 alkoxy being selected from methoxy, ethoxy, n-propoxy, isopropoxy, n-butoxy, isobutoxy, n-pentoxy, isopentoxy, n-hexyloxy, isohexyloxy and 3,3-dimethylbutoxy.

17. The amino-imine metal complex as claimed in claim 6, having at least one of the following features:

R₁ and R₂ are independently selected from the group consisting of C1-C20 alkyl with or without a substituent Q and C6-C20 aryl with or without a substituent Q, with a proviso that at least one of R₁ and R₂ is a group represented by Formula A:

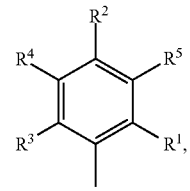

Formula A wherein, R¹-R⁵ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkyloxy with or without a substituent Q, C7-C20 alkaryl with or without a substituent Q and C7-C20 alkaryloxy with or without a substituent Q, and R¹-R⁵ are optionally joined to form a ring or ring system;

each X is independently selected from the group consisting of halogen, C1-C6 alkyl with or without a substituent Q and C1-C6 alkoxy with or without a substituent Q;

each R₁₁ is independently a C1-C10 alkyl with or without a substituent Q;

each R₅ is independently selected from the group consisting of C1-C10 alkyl with or without a substituent Q, C6-C10 aryl with or without a substituent Q, C7-C15 aralkyl with or without a substituent Q and C7-C15 alkaryl with or without a substituent Q;

the substituent Q is selected from the group consisting of halogen, hydroxy, C1-C6 alkyl, halogenated C1-C6 alkyl, C1-C6 alkoxy and halogenated C1-C6 alkoxy, with the C1-C6 alkyl being selected from methyl, ethyl, n-propyl, isopropyl, n-butyl, isobutyl, n-pentyl, isopentyl, n-hexyl, isohexyl and 3,3-dimethylbutyl, and with the C1-C6 alkoxy being selected from methoxy, ethoxy, n-propoxy, isopropoxy, n-butoxy, isobutoxy, n-pentoxy, isopentoxy, n-hexyloxy, isohexyloxy and 3,3-dimethylbutoxy; and R₂₁-R₂₄ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C1-C10 alkoxy with or without a substituent Q, C2-C10 alkenoxy with or without a substituent Q, C2-C10 alkynoxy with or without a substituent Q, C6-C15 aryl with or without a substituent Q, C7-C15 aralkyl with or without a substituent Q, C7-C15 alkaryl with or without a substituent Q, C6-C15 aryloxy with or without a substituent Q, C7-C15 aralkoxy with or without a substituent Q and C7-C15 alkaryloxy with or without a substituent Q.

18. The amino-imine metal complex as claimed in claim 9, wherein the amino-imine metal complex is selected from the group consisting of:

1) the complex represented by Formula V, wherein $R^1=R^3=R^4=R^6$=isopropyl, $R^2=R^5=R^7\text{-}R^{10}=R_{21}=R_{22}$=H, $R_5$=CH$_3$, $R_{11}$=ethyl, M=Ni, Y=O, X=Br;
2) the complex represented by Formula V, wherein $R^1=R^3=R^4=R^6$=ethyl, $R^2=R^5=R^7\text{-}R^{10}=R_{21}=R_{22}$=H, $R_5$=CH$_3$, $R_{11}$=ethyl, M=Ni, Y=O, X=Br;
3) the complex represented by Formula V, wherein $R^1=R^3=R^4=R^6$=methyl, $R^2=R^5=R^7\text{-}R^{10}=R_{21}=R_{22}$=H, $R_5$=CH$_3$, $R_{11}$=ethyl, M=Ni, Y=O, X=Br;
4) the complex represented by Formula V, wherein $R^1\text{-}R^6$=methyl, $R^7\text{-}R^{10}=R_{21}=R^{22}$=H, $R_5$=CH$_3$, $R_{11}$=ethyl, M=Ni, Y=O, X=Br;
5) the complex represented by Formula V, wherein $R^1=R^3=R^4=R^6$=Br, $R^2=R^5=R^7\text{-}R^{10}=R_{21}=R_{22}$=H, $R_5$=CH$_3$, $R_{11}$=ethyl, M=Ni, Y=O, X=Br;
6) the complex represented by Formula V, wherein $R^1=R^3=R^4=R^6$=Cl, $R^2=R^5=R^7\text{-}R^{10}=R_{21}=R_{22}$=H, $R_5$=CH$_3$, $R_{11}$=ethyl, M=Ni, Y=O, X=Br;
7) the complex represented by Formula V, wherein $R^1=R^3=R^4=R^6$=F, $R^2=R^5=R^7\text{-}R^{10}=R_{21}=R_{22}$=H, $R_5$=CH$_3$, $R_{11}$=ethyl, M=Ni, Y=O, X=Br;
8) the complex represented by Formula V, wherein $R^1=R^3=R^4=R^6$=isopropyl, $R^2=R^5=R^7\text{-}R^{10}=R_{21}=R_{22}$=H, $R_5=R_{11}$=ethyl, M=Ni, Y=O, X=Br;
9) the complex represented by Formula V, wherein $R^1=R^3=R^4=R^6$=ethyl, $R^2=R^5=R^7\text{-}R^{10}=R_{21}=R_{22}$=H, $R_5=R_{11}$=ethyl, M=Ni, Y=O, X=Br;
10) the complex represented by Formula V, wherein $R^1=R^3=R^4=R^6$=methyl, $R^2=R^5=R^7\text{-}R^{10}=R_{21}=R_{22}$=H, $R_5=R_{11}$=ethyl, M=Ni, Y=O, X=Br;
11) the complex represented by Formula V, wherein $R^1\text{-}R^6$=methyl, $R^7\text{-}R^{10}=R_{21}=R_{22}$=H, $R_5=R_{11}$=ethyl, M=Ni, Y=O, X=Br;
12) the complex represented by Formula V, wherein $R^1=R^3=R^4=R^6$=Br, $R^2=R^5=R^7\text{-}R^{10}=R_{21}=R_{22}$=H, $R_5=R_{11}$=ethyl, M=Ni, Y=O, X=Br;
13) the complex represented by Formula V, wherein $R^1=R^3=R^4=R^6$=Cl, $R^2=R^5=R^7\text{-}R^{10}=R_{21}=R_{22}$=H, $R_5=R_{11}$=ethyl, M=Ni, Y=O, X=Br;
14) the complex represented by Formula V, wherein $R^1=R^3=R^4=R^6$=F, $R^2=R^5=R^7\text{-}R^{10}=R_{21}=R_{22}$=H, $R_5=R_{11}$=ethyl, M=Ni, Y=O, X=Br;
15) the complex represented by Formula V, wherein $R^1=R^3=R^4=R^6$=isopropyl, $R^2=R^5=R^7\text{-}R^{10}=R_{21}=R_{22}$=H, $R_5$=CH$_3$, $R_{11}$=isobutyl, M=Ni, Y=O, X=Br;
16) the complex represented by Formula V, wherein $R^1=R^3=R^4=R^6$=ethyl, $R^2=R^5=R^7\text{-}R^{10}=R_{21}=R_{22}$=H, $R_5$=CH$_3$, $R_{11}$=isobutyl, M=Ni, Y=O, X=Br;
17) the complex represented by Formula V, wherein $R^1=R^3=R^4=R^6$=methyl, $R^2=R^5=R^7\text{-}R^{10}=R_{21}=R_{22}$=H, $R_5$=CH$_3$, $R_{11}$=isobutyl, M=Ni, Y=O, X=Br;
18) the complex represented by Formula V, wherein $R^1\text{-}R^6$=methyl, $R^7\text{-}R^{10}=R_{21}=R_{22}$=H, $R_5$=CH$_3$, $R_{11}$=isobutyl, M=Ni, Y=O, X=Br;
19) the complex represented by Formula V, wherein $R^1=R^3=R^4=R^6$=Br, $R^2=R^5=R^7\text{-}R^{10}=R_{21}=R_{22}$=H, $R_5$=CH$_3$, $R_{11}$=isobutyl, M=Ni, Y=O, X=Br;
20) the complex represented by Formula V, wherein $R^1=R^3=R^4=R^6$=Cl, $R^2=R^5=R^7\text{-}R^{10}=R_{21}=R_{22}$=H, $R_5$=CH$_3$, $R_{11}$=isobutyl, M=Ni, Y=O, X=Br;
21) the complex represented by Formula V, wherein $R^1=R^3=R^4=R^6$=F, $R^2=R^5=R^7\text{-}R^{10}=R_{21}=R_{22}$=H, $R_5$=CH$_3$, $R_{11}$=isobutyl, M=Ni, Y=O, X=Br;
22) the complex represented by Formula V, wherein $R^1=R^3=R^4=R^6$=isopropyl, $R^2=R^5=R^7\text{-}R^{10}=R_{22}$=H, $R_{21}$=tert-butyl, $R_5$=CH$_3$, $R_{11}$=ethyl, M=Ni, Y=O, X=Br;
23) the complex represented by Formula V, wherein $R^1=R^3=R^4=R^6$=ethyl, $R^2=R^5=R^7\text{-}R^{10}=R_{22}$=H, $R_{21}$=tert-butyl, $R_5$=CH$_3$, $R_{11}$=ethyl, M=Ni, Y=O, X=Br;
24) the complex represented by Formula V, wherein $R^1=R^3=R^4=R^6$=methyl, $R^2=R^5=R^7\text{-}R^{10}=R_{22}$=H, $R_{21}$=tert-butyl, $R_5$=CH$_3$, $R_{11}$=ethyl, M=Ni, Y=O, X=Br;
25) the complex represented by Formula V, wherein $R^1\text{-}R^6$=methyl, $R^7\text{-}R^{10}=R_{22}$=H, $R_{21}$=tert-butyl, $R_5$=CH$_3$, $R_{11}$=ethyl, M=Ni, Y=O, X=Br;
26) the complex represented by Formula V, wherein $R^1=R^3=R^4=R^6$=Br, $R^2=R^5=R^7\text{-}R^{10}=R_{22}$=H, $R_{21}$=tert-butyl, $R_5$=CH$_3$, $R_{11}$=ethyl, M=Ni, Y=O, X=Br;
27) the complex represented by Formula V, wherein $R^1=R^3=R^4=R^6$=Cl, $R^2=R^5=R^7\text{-}R^{10}=R_{22}$=H, $R_{21}$=tert-butyl, $R_5$=CH$_3$, $R_{11}$=ethyl, M=Ni, Y=O, X=Br;
28) the complex represented by Formula V, wherein $R^1=R^3=R^4=R^6$=F, $R^2=R^5=R^7\text{-}R^{10}=R_{22}$=H, $R_{21}$=tert-butyl, $R_5$=CH$_3$, $R_{11}$=ethyl, M=Ni, Y=O, X=Br;
29) the complex represented by Formula V, wherein $R^1=R^3=R^4=R^6$=isopropyl, $R^2=R^5=R^7\text{-}R^{10}=R_{22}$=H, $R_{21}$=tert-butyl, $R_5$=CH$_3$, $R_{11}$=isobutyl, M=Ni, Y=O, X=Br;
30) the complex represented by Formula V, wherein $R^1=R^3=R^4=R^6$=ethyl, $R^2=R^5=R^7\text{-}R^{10}=R_{22}$=H, $R_{21}$=tert-butyl, $R_5$=CH$_3$, $R_{11}$=isobutyl, M=Ni, Y=O, X=Br;
31) the complex represented by Formula V, wherein $R^1=R^3=R^4=R^6$=methyl, $R^2=R^5=R^7\text{-}R^{10}=R_{22}$=H, $R_{21}$=tert-butyl, $R_5$=CH$_3$, $R_{11}$=isobutyl, M=Ni, Y=O, X=Br;
32) the complex represented by Formula V, wherein $R^1\text{-}R^6$=methyl, $R^7\text{-}R^{10}=R_{22}$=H, $R_{21}$=tert-butyl, $R_5$=CH$_3$, $R_{11}$=isobutyl, M=Ni, Y=O, X=Br;
33) the complex represented by Formula V, wherein $R^1=R^3=R^4=R^6$=Br, $R^2=R^5=R^7\text{-}R^{10}=R_{22}$=H, $R_{21}$=tert-butyl, $R_5$=CH$_3$, $R_{11}$=isobutyl, M=Ni, Y=O, X=Br;
34) the complex represented by Formula V, wherein $R^1=R^3=R^4=R^6$=Cl, $R^2=R^5=R^7\text{-}R^{10}=R_{22}$=H, $R_{21}$=tert-butyl, $R_5$=CH$_3$, $R_{11}$=isobutyl, M=Ni, Y=O, X=Br;
35) the complex represented by Formula V, wherein $R^1=R^3=R^4=R^6$=F, $R^2=R^5=R^7\text{-}R^{10}=R_{22}$=H, $R_{21}$=tert-butyl, $R_5$=CH$_3$, $R_{11}$=isobutyl, M=Ni, Y=O, X=Br;
36) the complex represented by Formula V', wherein $R^1=R^3=R^4=R^6$=isopropyl, $R^2=R^5=R^7\text{-}R^{10}=R_{31}=R_{32}$=H, $R_5$=CH$_3$, $R_{11}$=ethyl, M=Ni, Y=O, X=Br;
37) the complex represented by Formula V', wherein $R^1=R^3=R^4=R^6$=ethyl, $R^2=R^5=R^7\text{-}R^{10}=R_{31}=R_{32}$=H, $R_5$=CH$_3$, $R_{11}$=ethyl, M=Ni, Y=O, X=Br;

38) the complex represented by Formula V', wherein $R^1=R^3=R^4=R^6$=methyl, $R^2=R^5=R^7$-$R^{10}=R_{31}=R_{32}$=H, $R_5$=CH$_3$, $R_{11}$=ethyl, M=Ni, Y=O, X=Br;
39) the complex represented by Formula V', wherein $R^1$-$R^6$=methyl, $R^7$-$R^{10}=R_{31}=R_{32}$=H, $R_5$=CH$_3$, $R_{11}$=ethyl, M=Ni, Y=O, X=Br;
40) the complex represented by Formula V', wherein $R^1=R^3=R^4=R^6$=Br, $R^2=R^5=R^7$-$R^{10}=R_{31}=R_{32}$=H, $R_5$=CH$_3$, $R_{11}$=ethyl, M=Ni, Y=O, X=Br;
41) the complex represented by Formula V', wherein $R^1=R^3=R^4=R^6$=Cl, $R^2=R^5=R^7$-$R^{10}=R_{31}=R_{32}$=H, $R_5$=CH$_3$, $R_{11}$=ethyl, M=Ni, Y=O, X=Br;
42) the complex represented by Formula V', wherein $R^1=R^3=R^4=R^6$=F, $R^2=R^5=R^7$-$R^{10}=R_{31}=R_{32}$=H, $R_5$=CH$_3$, $R_{11}$=ethyl, M=Ni, Y=O, X=Br;
43) the complex represented by Formula V', wherein $R^1=R^3=R^4=R^6$=isopropyl, $R^2=R^5=R^7$-$R^{10}=R_{31}=R_{32}$=H, $R_5$=CH$_3$, $R_{11}$=isobutyl, M=Ni, Y=O, X=Br;
44) the complex represented by Formula V', wherein $R^1=R^3=R^4=R^6$=ethyl, $R^2=R^5=R^7$-$R^{10}=R_{31}=R_{32}$=H, $R_5$=CH$_3$, $R_{11}$=isobutyl, M=Ni, Y=O, X=Br;
45) the complex represented by Formula V', wherein $R^1=R^3=R^4=R^6$=methyl, $R^2=R^5=R^7$-$R^{10}=R_{31}=R_{32}$=H, $R_5$=CH$_3$, $R_{11}$=isobutyl, M=Ni, Y=O, X=Br;
46) the complex represented by Formula V', wherein $R^1$-$R^6$=methyl, $R^7$-$R^{10}=R_{31}=R_{32}$=H, $R_5$=CH$_3$, $R_{11}$=isobutyl, M=Ni, Y=O, X=Br;
47) the complex represented by Formula V', wherein $R^1=R^3=R^4=R^6$=Br, $R^2=R^5=R^7$-$R^{10}=R_{31}=R_{32}$=H, $R_5$=CH$_3$, $R_{11}$=isobutyl, M=Ni, Y=O, X=Br;
48) the complex represented by Formula V', wherein $R^1=R^3=R^4=R^6$=Cl, $R^2=R^5=R^7$-$R^{10}=R_{31}=R_{32}$=H, $R_5$=CH$_3$, $R_{11}$=isobutyl, M=Ni, Y=O, X=Br;
49) the complex represented by Formula V', wherein $R^1=R^3=R^4=R^6$=F, $R^2=R^5=R^7$-$R^{10}=R_{31}=R_{32}$=H, $R_5$=CH$_3$, $R_{11}$=isobutyl, M=Ni, Y=O, X=Br;
50) the complex represented by Formula V', wherein $R^1=R^3=R^4=R^6$=isopropyl, $R^2=R^5=R^7$-$R^{10}$=H, $R_{31}=R_{32}=R_{11}$=ethyl, $R_5$=CH$_3$, M=Ni, Y=O, X=Br;
51) the complex represented by Formula V', wherein $R^1=R^3=R^4=R^6$=ethyl, $R^2=R^5=R^7$-$R^{10}$=H, $R_{31}=R_{32}=R_{11}$=ethyl, $R_5$=CH$_3$, M=Ni, Y=O, X=Br;
52) the complex represented by Formula V', wherein $R^1=R^3=R^4=R^6$=methyl, $R^2=R^5=R^7$-$R^{10}$=H, $R_{31}=R_{32}=R_{11}$=ethyl, $R_5$=CH$_3$, M=Ni, Y=O, X=Br;
53) the complex represented by Formula V', wherein $R^1$-$R^6$=methyl, $R^7$-$R^{10}$=H, $R_{31}=R_{32}=R_{11}$=ethyl, $R_5$=CH$_3$, M=Ni, Y=O, X=Br;
54) the complex represented by Formula V', wherein $R^1=R^3=R^4=R^6$=Br, $R^2=R^5=R^7$-$R^{10}$=H, $R_{31}=R_{32}=R_{11}$=ethyl, $R_5$=CH$_3$, M=Ni, Y=O, X=Br;
55) the complex represented by Formula V', wherein $R^1=R^3=R^4=R^6$=Cl, $R^2=R^5=R^7$-$R^{10}$=H, $R_{31}=R_{32}=R_{11}$=ethyl, $R_5$=CH$_3$, M=Ni, Y=O, X=Br;
56) the complex represented by Formula V', wherein $R^1=R^3=R^4=R^6$=F, $R^2=R^5=R^7$-$R^{10}$=H, $R_{31}=R_{32}=R_{11}$=ethyl, $R_5$=CH$_3$, M=Ni, Y=O, X=Br;
57) the complex represented by Formula V', wherein $R^1=R^3=R^4=R^6$=isopropyl, $R^2=R^5=R^7$-$R^{10}$=H, $R_{31}=R_{32}=R_{11}$=ethyl, $R_5$=CH$_3$, M=Ni, Y=O, X=Br;
58) the complex represented by Formula V', wherein $R^1=R^3=R^4=R^6$=ethyl, $R^2=R^5=R^7$-$R^{10}$=H, $R_{31}=R_{32}$=ethyl, $R_5$=CH$_3$, $R_{11}$=isobutyl, M=Ni, Y=O, X=Br;
59) the complex represented by Formula V', wherein $R^1=R^3=R^4=R^6$=methyl, $R^2=R^5=R^7$-$R^{10}$=H, $R_{31}=R_{32}$=ethyl, $R_5$=CH$_3$, $R_{11}$=isobutyl, M=Ni, Y=O, X=Br;
60) the complex represented by Formula V', wherein $R^1$-$R^6$=methyl, $R^7$-$R^{10}$=H, $R_{31}=R_{32}$=ethyl, $R_5$=CH$_3$, $R^{11}$=isobutyl, M=Ni, Y=O, X=Br;
61) the complex represented by Formula V', wherein $R^1=R^3=R^4=R^6$=Br, $R^2=R^5=R^7$-$R^{10}$=H, $R_{31}=R_{32}$=ethyl, $R_5$=CH$_3$, $R^{11}$=isobutyl, M=Ni, Y=O, X=Br;
62) the complex represented by Formula V', wherein $R^1=R^3=R^4=R^6$=Cl, $R^2=R^5=R^7$-$R^{10}$=H, $R_{31}=R_{32}$=ethyl, $R_5$=CH$_3$, $R^{11}$=isobutyl, M=Ni, Y=O, X=Br; and
63) the complex represented by Formula V', wherein $R^1=R^3=R^4=R^6$=F, $R^2=R^5=R^7$-$R^{10}$=H, $R_{31}=R_{32}$=ethyl, $R_5$=CH$_3$, $R^{11}$=isobutyl, M=Ni, Y=O, X=Br.

19. The method as claimed in claim 10, wherein the amino-imine compound represented by Formula VI is as shown by the following Formula VIa:

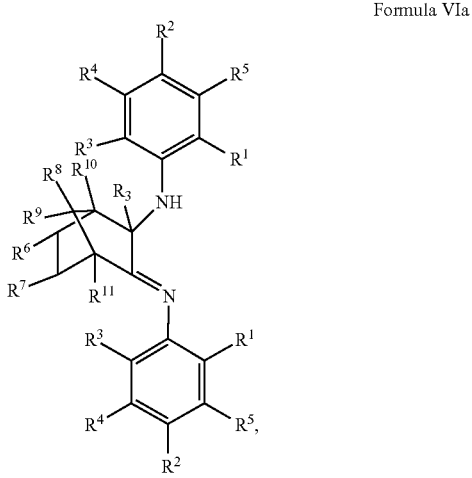

Formula VIa wherein, $R^1$-$R^{11}$ and $R_3$ have the same meanings as defined for Formula III in claim 3.

20. The method as claimed in claim 11, wherein in step 2) for the preparation of the amino-imine compound represented by Formula VI, the molar ratio of the $A(R_3)_a$ to the amine compound is from 2.0 to 6.0; and/or
the diketone compound represented by Formula VII is represented by the following Formula VIIa:

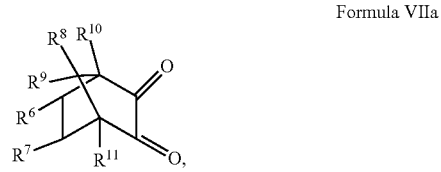

Formula VIIa wherein $R^6$-$R^{11}$ have the same definitions as for Formula III in claim 3.

21. The method as claimed in claim 13, wherein the diimine compound represented by Formula VIII is represented the following Formula VIIIa:

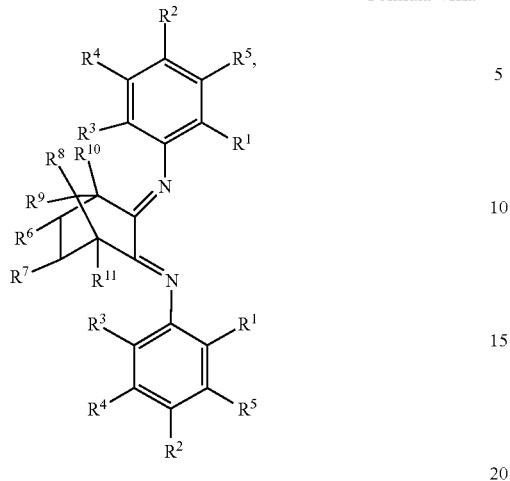
Formula VIIIa
wherein $R^1$-$R^{11}$ have the same definition as for Formula III in claim 3.
22. The olefin polymerization process as claimed in claim 15, wherein the olefin polymerization reaction is carried out at a temperature from −20° C. to 150° C. under a polymerization pressure from 0.01 to 2.0 MPa.
* * * * *